(12) United States Patent
Chauhan et al.

(10) Patent No.: US 10,754,655 B2
(45) Date of Patent: Aug. 25, 2020

(54) AUTOMATIC PREDICATION OF HARD-TO-PREDICT CONVERGENT BRANCHES

(71) Applicant: Intel Corporation, Santa Clara, CA (US)

(72) Inventors: Adarsh Chauhan, Bangalore (IN); Hong Wang, Santa Clara, CA (US); Jayesh Gaur, Bangalore (IN); Zeev Sperber, Zikhron Ya'akov (IL); Sumeet Bandishte, Indore (IN); Lihu Rappoport, Haifa (IL); Stanislav Shwartsman, Haifa (IL); Kamil Garifullin, Moscow (RU); Sreenivas Subramoney, Bangalore (IN); Adi Yoaz, Hof HaCarmel (IL)

(73) Assignee: Intel Corporation, Santa Clara, CA (US)

( * ) Notice: Subject to any disclaimer, the term of this patent is extended or adjusted under 35 U.S.C. 154(b) by 138 days.

(21) Appl. No.: 16/021,838

(22) Filed: Jun. 28, 2018

(65) Prior Publication Data

US 2020/0004542 A1 Jan. 2, 2020

(51) Int. Cl.
*G06F 9/32* (2018.01)
*G06F 9/42* (2006.01)
(Continued)

(52) U.S. Cl.
CPC ........ *G06F 9/3806* (2013.01); *G06F 9/30058* (2013.01); *G06F 9/30163* (2013.01);
(Continued)

(58) Field of Classification Search
CPC .. G06F 9/3806; G06F 9/30058; G06F 9/3842; G06F 9/3844; G06F 9/3846;
(Continued)

(56) References Cited

U.S. PATENT DOCUMENTS

| 6,505,292 B1 * | 1/2003 | Witt | G06F 9/30021 |
| | | | 712/207 |
| 9,361,144 B2 * | 6/2016 | Gschwind | G06F 9/30145 |
| 2003/0097549 A1 * | 5/2003 | Ukai | G06F 9/30054 |
| | | | 712/240 |

OTHER PUBLICATIONS

Jimenez, Daniel A, and Lin Calvin, "Dynamic Branch Prediction with Perceptrons", In Proceedings of the 7th International Symposium on High-Performance Computer Architectuer, pp. 197-206, 2001.

(Continued)

*Primary Examiner* — Daniel H Pan
(74) *Attorney, Agent, or Firm* — Nicholson De Vos Webster & Elliot LLP

(57) ABSTRACT

A processing device includes a branch IP table and branch predication circuitry coupled to the branch IP table. The branch predication circuitry to: determine a dynamic convergence point in a conditional branch of set of instructions; store the dynamic convergence point in the branch IP table; fetch a first and second speculative path of the conditional branch; while determining which of the first speculative path and the second speculative path is a taken path of the conditional branch and determining whether a dynamic convergence point is fetched corresponding to the stored dynamic convergence point, stall scheduling of instructions of the first speculative path and the second speculative path; and in response to determining that one of the first speculative path and the second speculative path is the taken path and the fetched dynamic convergence point corresponds to the stored convergence point, resume scheduling of the instructions of the taken path.

18 Claims, 20 Drawing Sheets

(51) Int. Cl.
*G06F 9/38* (2018.01)
*G06F 9/30* (2018.01)

(52) U.S. Cl.
CPC .......... *G06F 9/3844* (2013.01); *G06F 9/3846* (2013.01); *G06F 9/3848* (2013.01)

(58) Field of Classification Search
CPC .. G06F 9/3848; G06F 9/30163; G06F 9/3861; G06F 9/30076; G06F 9/3802; G06F 9/3814
USPC .......................................... 712/207, 237–240
See application file for complete search history.

(56) References Cited

OTHER PUBLICATIONS

Kim, H, Joao, J.A., Mutlu, O., and Patt, Y. N., "Diverge-Merge Processor (DMP): Dynamic Predicated Execution of Complex Control-Flow Graphs Based on Frequently Executed Paths", In MICRO-39, Sep. 2006, 21 pages.

Seznec, Andre and Michaud, Pierre, "A Case for (Partially)—Tagged Geometric History Length Branch Predictors", Journal of Instruction Level Parallelism, http://www.jilp.org/vol8/v8paper1.pdf), Apr. 2006, 23 pages.

Allen, John R., Ken Kennedy, Carrie Porterfield, and Joe Warren. "Conversion of control dependence to data dependence." In Proceedings of the 10th ACM SIGACT-SIGPLAN symposium on Principles of programming languages, pp. 177-189. 1983.

\* cited by examiner

600

```
┌─────────────────────────────────────────────────────────────────┐
│  Determine a dynamic convergence point in a direct conditional branch │
│                              610                                │
└─────────────────────────────────────────────────────────────────┘
                                │
                                ▼
┌─────────────────────────────────────────────────────────────────┐
│  Store the dynamic convergence point in a branch instruction pointer (IP) table │
│                              620                                │
└─────────────────────────────────────────────────────────────────┘
                                │
                                ▼
┌─────────────────────────────────────────────────────────────────┐
│  Fetch a first speculative path and a second speculative path of the direct conditional branch │
│                              630                                │
└─────────────────────────────────────────────────────────────────┘
                                │
                                ▼
┌─────────────────────────────────────────────────────────────────┐
│  While determining which of the first speculative path and the second speculative path │
│  is a correct path of the direct conditional branch, stalling scheduling of instructions of │
│  the first speculative path and the second speculative path    │
│                              640                                │
└─────────────────────────────────────────────────────────────────┘
                                │
                                ▼
┌─────────────────────────────────────────────────────────────────┐
│  In response to determining that one of the first speculative path and the second │
│  speculative path is the correct path, resume scheduling of the of the instructions of │
│  the correct path                                               │
│                              650                                │
└─────────────────────────────────────────────────────────────────┘
```

FIG. 6

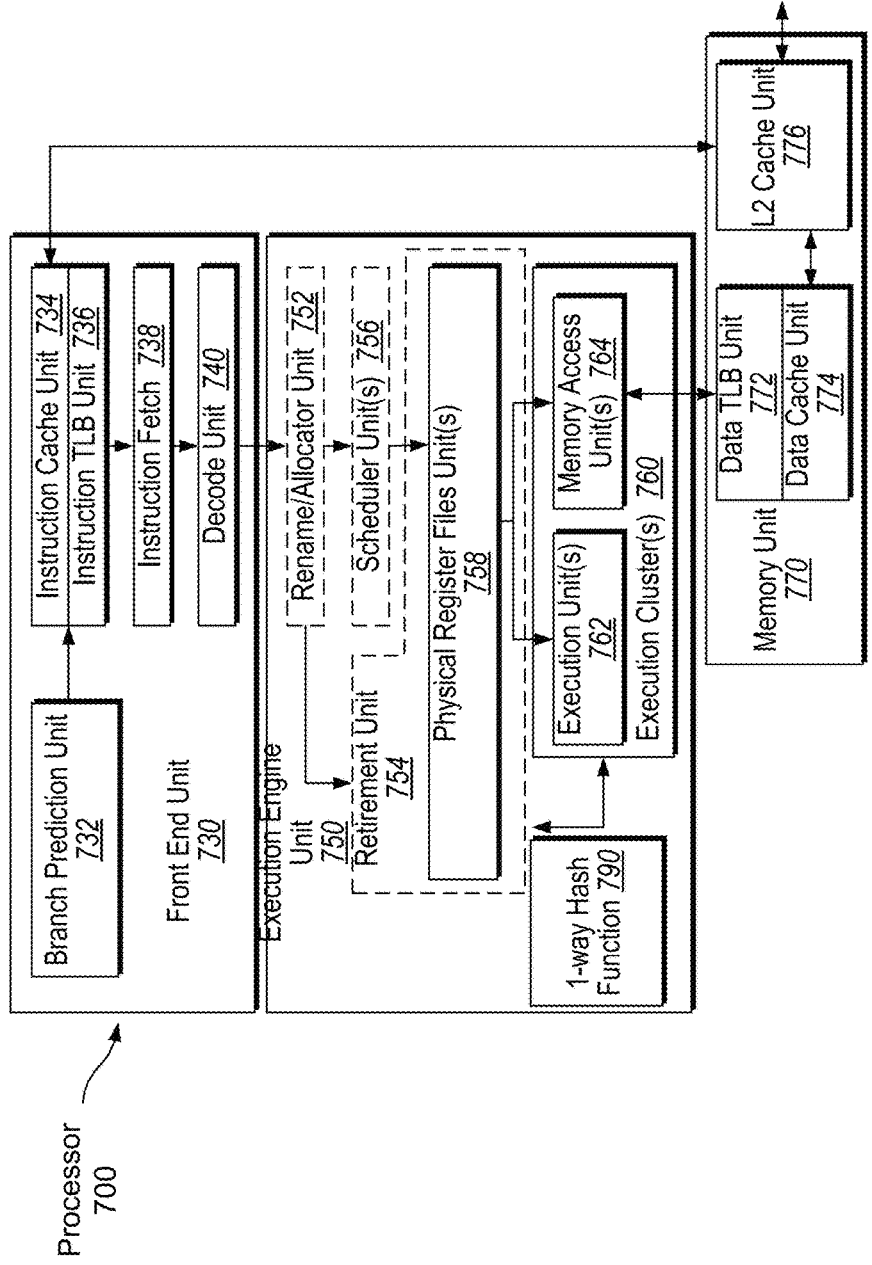

AUTOMATIC PREDICATION OF HARD-TO-PREDICT CONVERGENT BRANCHES

TECHNICAL FIELD

Embodiments of the disclosure relate generally to automatic predication of hard-to-predict convergent branches.

BACKGROUND

Superscalar processors leverage Instruction Level Parallelism (ILP) to increase sequential performance by concurrently executing several independent instructions from the same control flow. However, ILP is limited because of control and data dependencies. Control dependencies have long been handled using speculation on conditional (and even indirect) branch instructions to predict the direction that is likely to be taken upon execution. Typically, conventional branch prediction algorithms rely on a limited dynamic history of the past-taken and not-taken branches and use it as a prediction generating metric. These branch prediction units are coupled to the front-end and drive the instruction fetching logic. While in some instances, conventional branch predictors can be effective, they are still limited by the expensive area required for caching of history and the extent of history used for correlating branches.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 6 illustrates a flow diagram for automatic predication of convergent branches according to various embodiments.

FIG. 7A is a block diagram illustrating a micro-architecture for a processor according to an embodiment of the disclosure.

FIG. 7B is a block diagram illustrating an in-order pipeline and a register renaming stage, out-of-order issue/execution pipeline according to an embodiment of the disclosure.

DETAILED DESCRIPTION

Figure 1A:
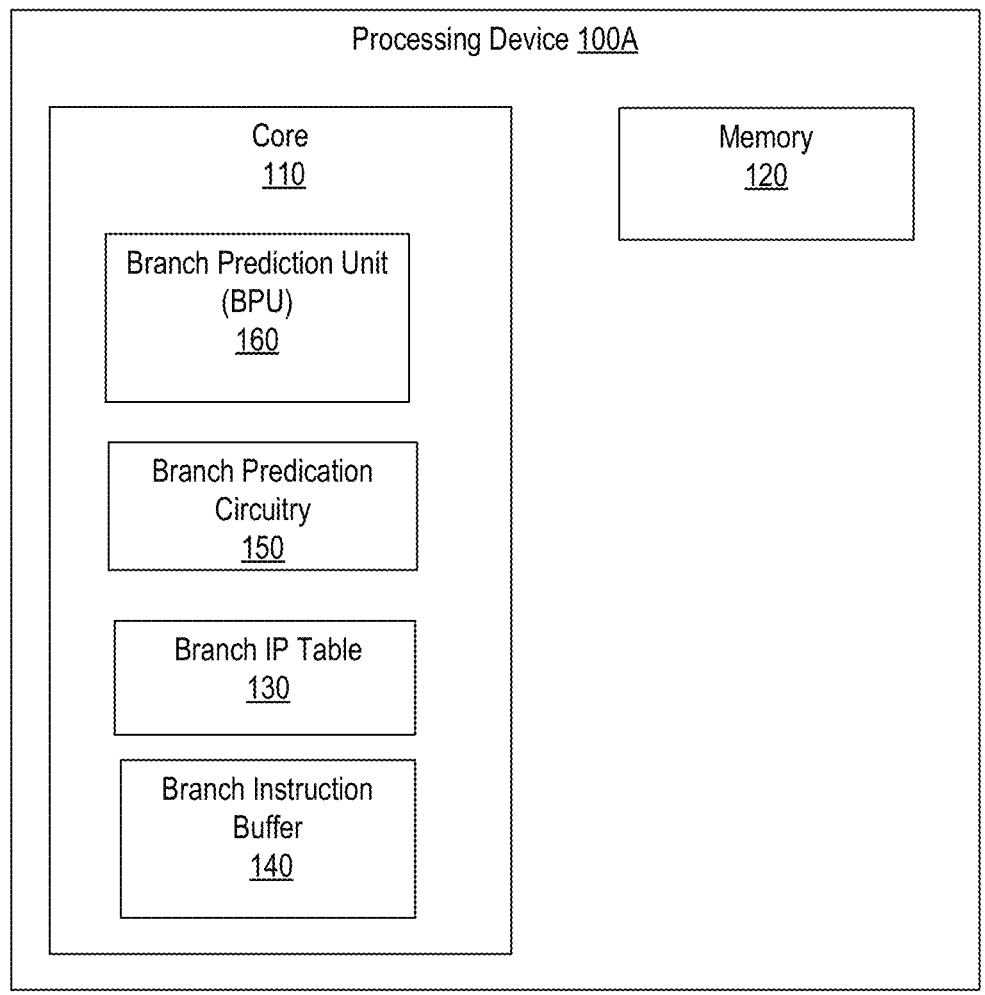
FIG. 1A illustrates a block diagram of a processing device according to various embodiments.
Figure 1B:
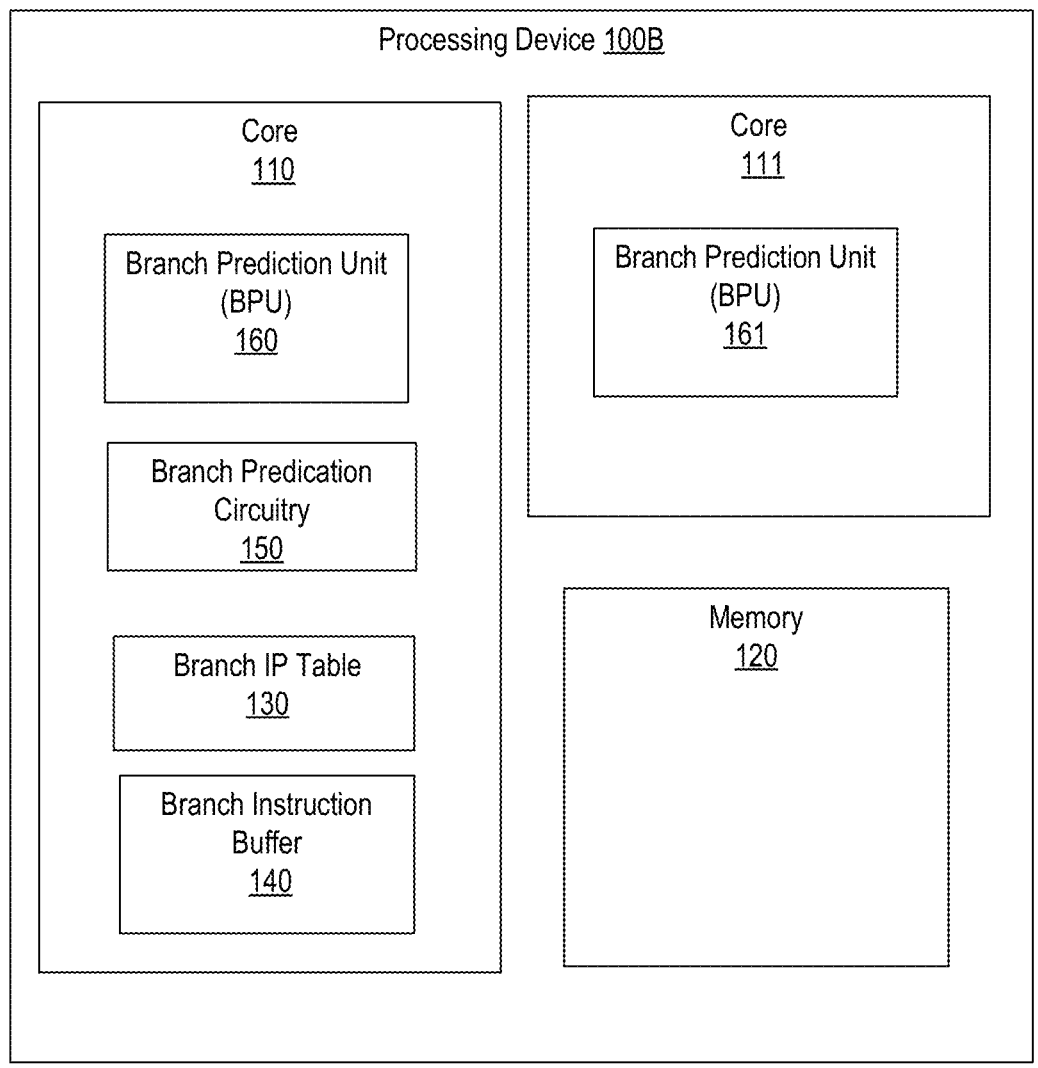
FIG. 1B illustrates a block diagram of a processing device according to various embodiments.
Figure 1C:
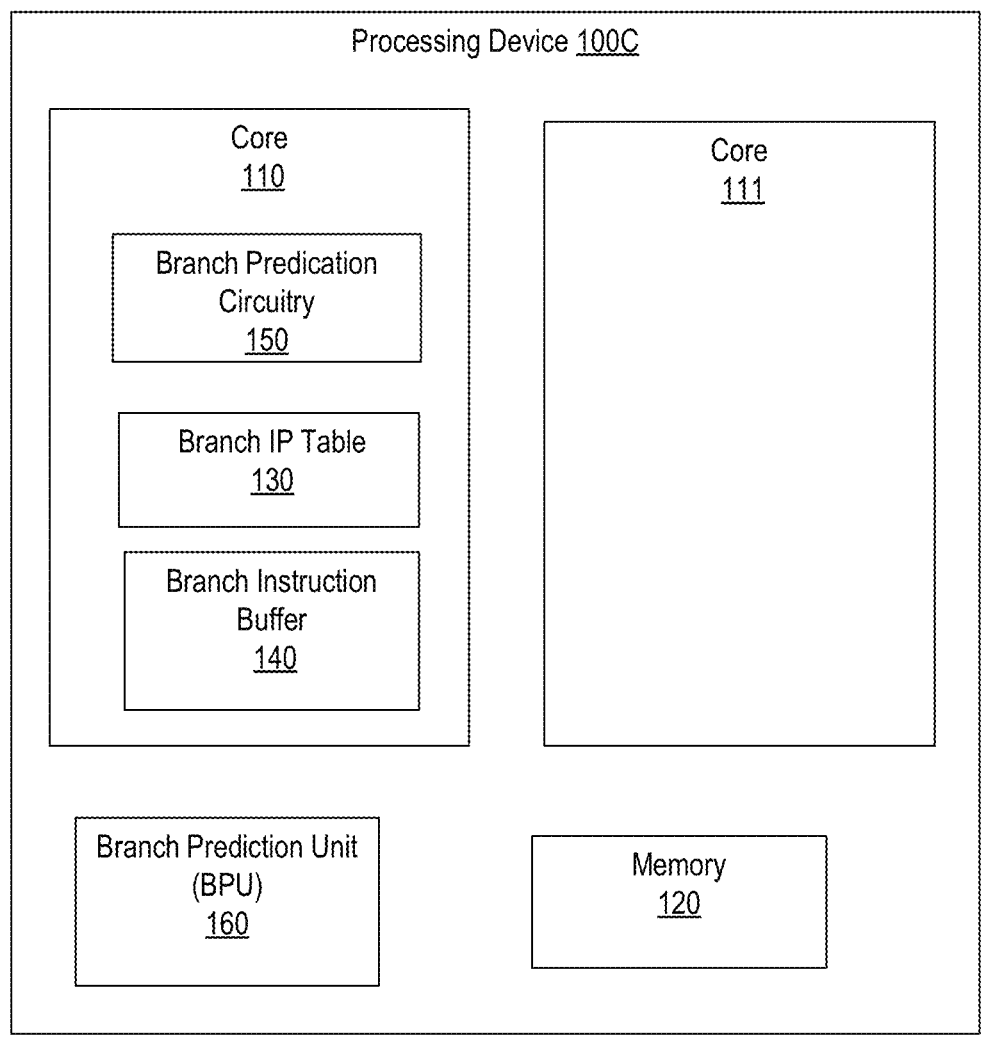
FIG. 1C illustrates a block diagram of a processing device according to various embodiments.
Figure 1D:
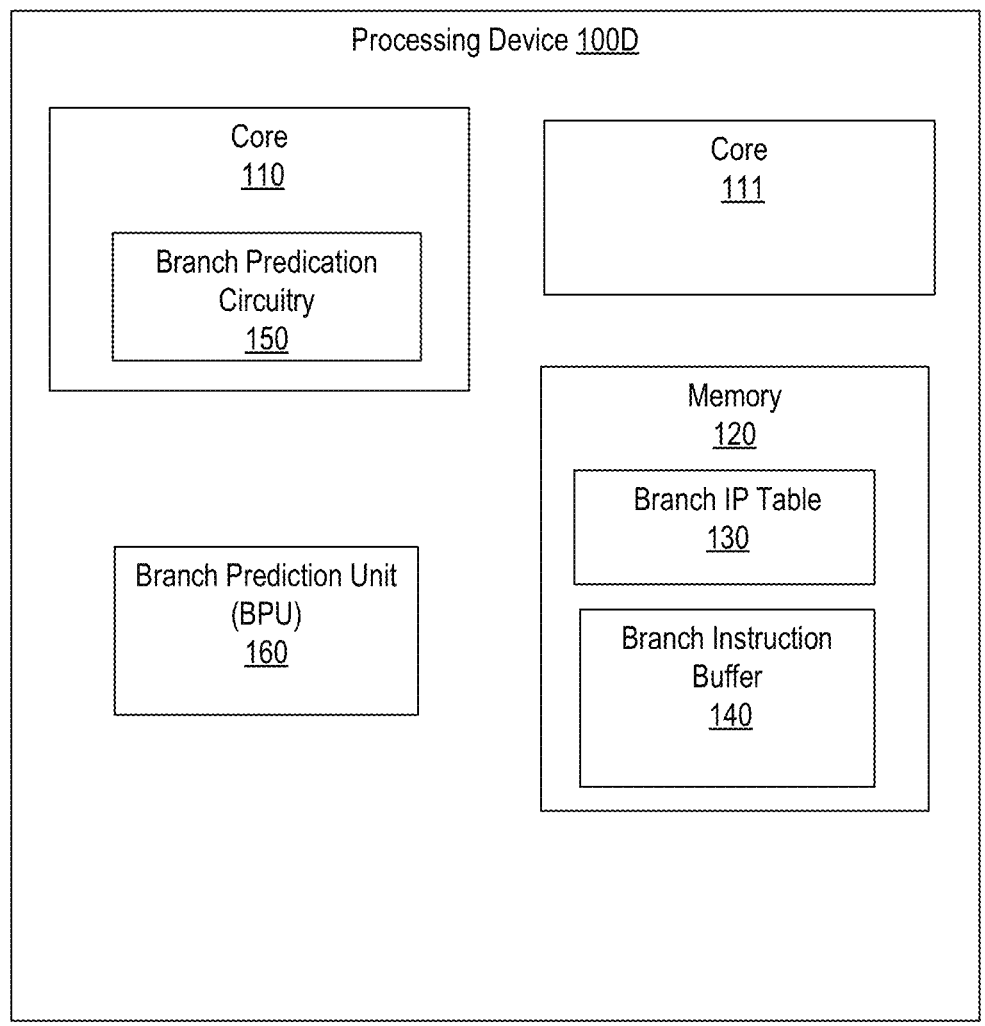
FIG. 1D illustrates a block diagram of a processing device according to various embodiments.
Figure 1E:
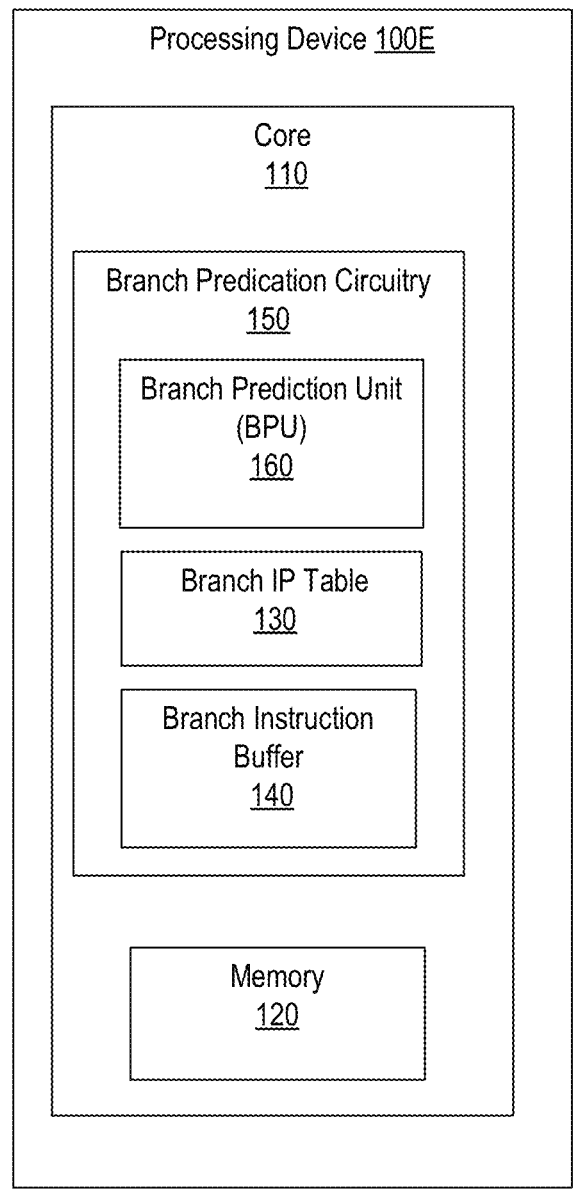
FIG. 1E illustrates a block diagram of a processing device according to various embodiments.
Figure 1F:
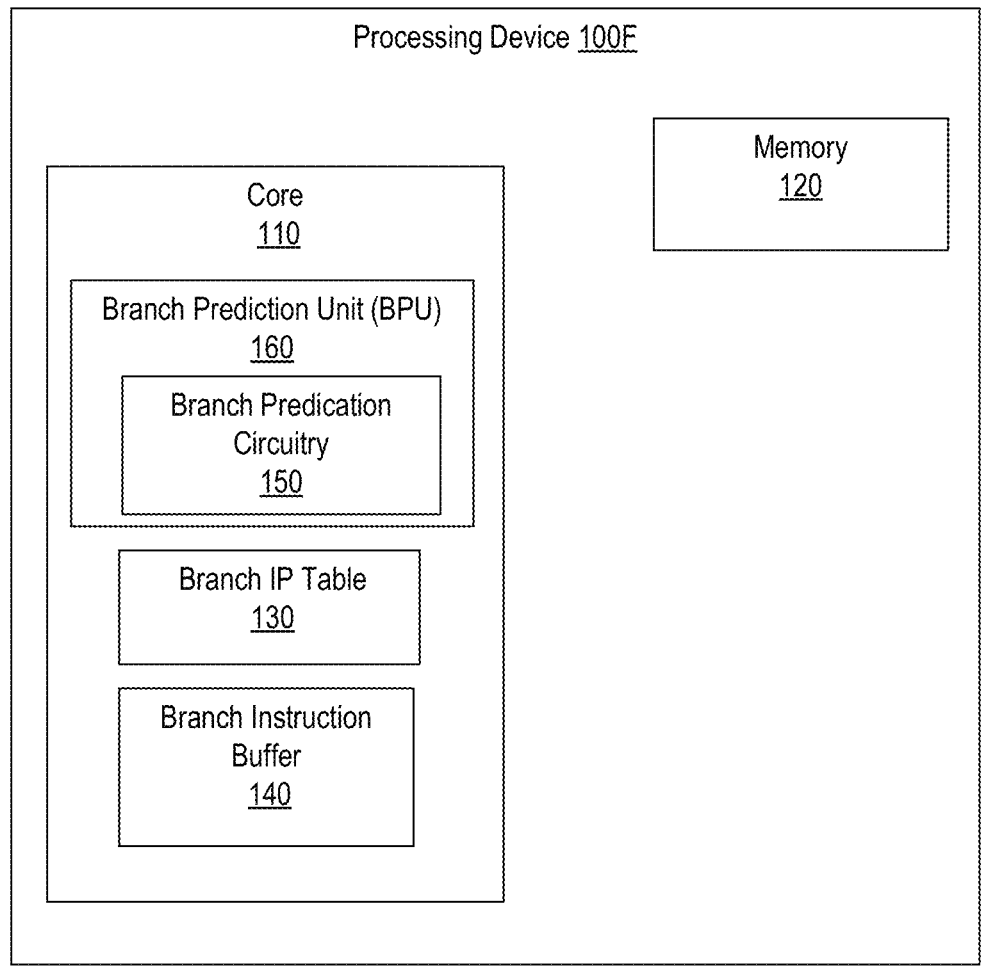
FIG. 1F illustrates a block diagram of a processing device according to various embodiments.

The embodiments described herein are generally directed to automatic predication of hard-to-predict (H2P) convergent branches. The automatic predication of H2P convergent branches, as described herein, may also be referred to as Auto-Predication of Convergent Branches (ACB). Branch prediction circuitry (referred to as "branch predictors" herein) of a processor may be limited by the expensive area used for caching of history and the extent of history used for correlating branches. Additionally, some conventional branch predictors are typically unable to predict H2P convergent branches whose predictive nature cannot be captured by historical or contextual information. For example, some conventional branch predictors are limited to front-end stalls caused by frequently mispredicting branches of non-learnable patterns or inherent data-dependent entropy. Some conventional branch predictors (e.g., static predication, Diverge-Merge Processor (DMP)) utilize compiler support and rely on software to identify code structures (e.g., convergent conditional branches) to perform workable optimizations. However, the primary task of identifying critical/H2P branches is difficult at the compiler level. Apart relying on modification of compiler-generated code by insertion of additional variable amounts of code, conventional branch predictors are also resource intensive as select-uops (micro-operations) competes with the original uops and consume out-of-order resources (e.g., reservation station (RS), retirement order buffer (ROB), fetch, issue and commit bandwidths). Moreover, conventional branch predictors may also have the compiler generate two sets of code for each branch (since the identification of H2P branch happens during execution). This increases the code footprint for many workloads, thereby negatively-effecting performance.

One example of an H2P branch is a conditional branch relying on a randomly generated value to choose the taken direction. The misprediction rate (i.e., the relative percentage of instances when branch speculation gives incorrect prediction and costs performance) is a measure of the difficulty of predicting the outcome of such branches. As modern out-of-order (OOO) processors have grown their instruction windows, the cost of misprediction has increased with every coming processor generation.

As described in further detail below, various embodiments described herein overcome the difficulty of predicting H2P branches. Embodiments described herein are directed to auto-predication of convergent branches (ACB) that is a hardware solution that learns conditional H2P branches and their dynamic point of re-convergence (if any). The point of re-convergence is the instruction pointer of the code where both the taken and the not-taken path converge. ACB then fetches both the 'if' and the 'else' portions of the branch, auto-predicates them in the OOO, and resolves the predication when the branch's true target is known. By fetching both of the paths, the factor of speculation is removed. Consequently, irrespective of the actual path taken upon branch solution, a control misspeculation/branch misprediction (CMBM) is saved). A CMBM is a resetting measure that flushes the pipeline and resets the control flow to the beginning of the actual path take.

It should be appreciated that ACB targets direct conditional branches with binary decisions during branch prediction. The first direction that starts at the target encoded in the branch instruction is referred to as the "taken" path and the other direction that is the fall-through path (or the "not-taken" path), is the next sequentially following instruction.

ACB also allows Control Independent Data Independent (CIDI) instructions, which are data-independent of the ACB branch and located beyond the reconvergence point, to proceed and execute when ready. Accordingly, ACB exposes and exploits instruction level parallelism (ILP) in a way that does not entail the work completed by the CIDI instructions to be discarded regardless of the outcome of the ACB branch. Accordingly, ACB balances the conflicting goals of maximizing ILP (which predication can reduce) and minimizing the penalty of misspeculation. This is accomplished in hardware and does not utilize compiler support. ACB dynamically detects complex reconvergence patterns of control flow and applies auto-predication in ways that static compiler analysis-based techniques cannot.

In various embodiments described herein a processing device includes a branch instruction pointer (IP) table and branch predication circuitry couple to the branch IP table. The branch predication circuitry to: determine a dynamic convergence point in a direct conditional branch; store the dynamic convergence point in the branch IP table; fetch a first speculative path and a second speculative path of the direct conditional branch; while determining which of the first speculative path and the second speculative path is a correct path of the direct conditional branch, stall scheduling of instructions of the first speculative path and the second speculative path; and in response to determining that one of the first speculative path and the second speculative path is the correct path, resume scheduling of the instructions of the correct path.

It is noted that a conditional branch includes a first path and a second path (e.g., if-else branch). During the actual execution of instructions, one of the paths is taken (e.g., the first path or the second path). To improve, the flow in the pipeline, branch prediction unit (BPU) 160 predicts which branch is to be taken before it actually known which branch is actually taken during execution of the instructions. If the wrong or incorrect path is predicted, then a misprediction penalty occurs, as described herein. However, if the predicted path is the actual path taken during execution then there is no misprediction penalty. The predicted path that is actually taken may be referred to herein as the "taken path."

Accordingly, embodiments described herein provide for, among other things, a hardware-based approach to reduce branch mispredictions. Additionally, embodiments described herein provide for improved processor performance due to increased instruction per cycle (IPC). The improved process performance is based in part on reducing the number of cycles performed by the processor during instruction execution due to reducing and/or preventing mispredictions (or CMBM) via the ACB of embodiments described herein.

FIG. 1A illustrates a processing device 100A to perform automatic predication of H2P convergent branches according to various embodiments. Processing device 100A includes, among other things, core 110 and memory 120. In various embodiments, core 110 includes branch IP table 130, branch instruction buffer 140, branch predication circuitry 150 and branch prediction unit (BPU) 160, which are described in further detail herein. In various embodiments, branch IP table 130 and branch instruction buffer 140 are implemented in core 110 by utilizing register functionality. Processing device 100A can include any number of cores. In various embodiments, core 110 is a central processing unit (CPU, a graphics processing unit (GPU) or the like).

FIGS. 1B-1F illustrated various embodiments of processing devices 100B-F, respectively. Processing devices 100B-F are similar to processing device 100A and perform the same or similar functions of processing device 100A. Accordingly, processing devices 100B-F also perform automatic predication of H2P convergent branches as described herein. The differences between processing device 100A and each of processing devices 100B-F are described below.

Processing device 100B includes two cores, core 110 and core 111. Core 110 includes BPU 160 and core 111 includes BPU 161. Accordingly, the branch predication circuitry 150 is utilized to perform ACB on instructions associated with either core.

Processing device 100C includes two cores (e.g., core 110 and core 111). BPU 160, in one embodiment, is shared by core 110 and core 111. Accordingly, BPU 160 is utilized to perform branch prediction on instructions associated with either core. Moreover, BPU 160 is located within processing device 100C but is not included in either core 110 or core 111.

Processing device 100D includes core 110 and core 111 that share BPU 160. Memory 120 includes branch IP table 130 and branch instruction buffer 140. In particular, table 130 and buffer 140 each store their respective information (as described herein) on a core-by-core basis. For example, table 130 and buffer 140 each store information for core 110 during ACB on instructions associated with core 110 and subsequently store information for core 111 during ACB on instructions associated with core 111.

Processing device 100E includes branch predication circuitry 150. In one embodiment, branch predication circuitry 150 includes BPU 160, branch IP table 130 and branch instruction buffer 140. Additionally, core 110 includes memory 120.

Processing device 100F includes BPU 160 (similar to processing device 100A). However, BPU 160 includes branch predication circuitry 150.

In embodiments of the disclosure, branch predication circuitry 150 (along with at least BPU 160, branch IP table 130, branch instruction buffer 140) are utilized to perform ACB. As described above, ACB balances the conflicting goals of maximizing ILP (which predication can reduce) and minimizing the penalty of misspeculation. That is, there is a tradeoff that exists between (1) doing extra work to fetch both the speculative paths, and (2) the cycles saved by preventing a CMBM.

The following description describes embodiments of quantifying this tradeoff (e.g., misprediction rate). A determination can be made as to which branches to target for ACB based on the misprediction rate. In various embodiments, the quantification is not performed on hardware or at runtime. Additionally, the quantification is an embodiment of a method used to compute parameters for designing hardware to implement ACB.

A conditional branch has an instruction point (IP) (e.g., IP x), which has two directions/paths (e.g., taken and not-taken paths) to predict on. For simplicity of representation, it is assumed that the fetch weight of each path is w/2. As discussed here, the value w refers to the number of instructions fetched for a branch IP (i.e., a total of w instructions to be fetched for the taken and not taken paths of the branch IP) and value m refers to the average misprediction rate of this branch. It is assumed that the cycles consumed in the back-end (e.g., OOO, memory, etc.) is negligible for converted no-ops (e.g., uops on the wrong path post this branch resolution) and both the baseline and the ACB behave similarly. Accordingly, it is beneficial if the cycles consumed in fetching are less than the cycles saved on mispredictions (also assuming p clock cycles as the misprediction penalty in terms of clock cycles and a is the allocation width of the machine (i.e. number of instructions that can be max allocated each cycle)). The above inequality relationship between cycle consumed in fetching being less than cycles saved on mispredictions can be described in the following equation:

$$(w/2)/a + m*p > w/a, \quad \text{Equation 1}$$

where a is allocation width in instructions per cycle, where p is a misprediction penalty in processor clock cycles, where $(w/2)/a + m*p$ is the baseline, where half of w is fetched at one time and which encounters misprediction latency m fraction of times, and w/a is the ACB which fetches the entire w and saves any misprediction instance. The baseline refers to similar processor architecture which does not implement ACB.

In one example, allocation-width a is six instructions per cycle and misprediction-penalty p is around 15 cycles on average:

$$m > w/(2*6*15), \text{ i.e., } m > w/180.$$

Thus, the inequality relationship described above can be interpreted as the ACB providing positive returns for the processor when the misprediction rate is proportional to the weight of the branch IP's body. In some instances, conditional branches with a small body of instructions (e.g., w=20) are beneficial. As such, in various embodiments, this can provide a minimum threshold for qualifying a branch as a H2P branch (m>20/180→m>0.11). Therefore, in the example above, when rounded down to 0.1, in some embodiments, branches having an average misprediction rate of at least 10% are implemented with the ACB. It should be appreciated that these values can be tuned and can change as the involved parameters may change depending on core configuration and how much extra fetch work can be tolerated.

In some embodiments, the size of either path of a conditional branch can be zero. For example, a path size may be zero when the jump target is the convergence point of both the directions, in which such code structures are classified as 'only-if' type branches. Jump target is the IP/address of the instruction to where a jump instruction directs the control flow of the program. For direct conditional branches, the jump target is encoded in the bytes of the jump instruction. When both of these paths have a non-zero size, the paths can be referred to as 'if-else' type branches. It should be appreciated that an advantage of the ACB is that it is able to detect more than simple 'only-if' and 'if-else' convergence patterns. By monitoring the dynamic control flow, various complicated dynamic convergence patterns are detected that conventional branch predictors (e.g., static predication and DMP) are not able to detect.

Figure 2A:
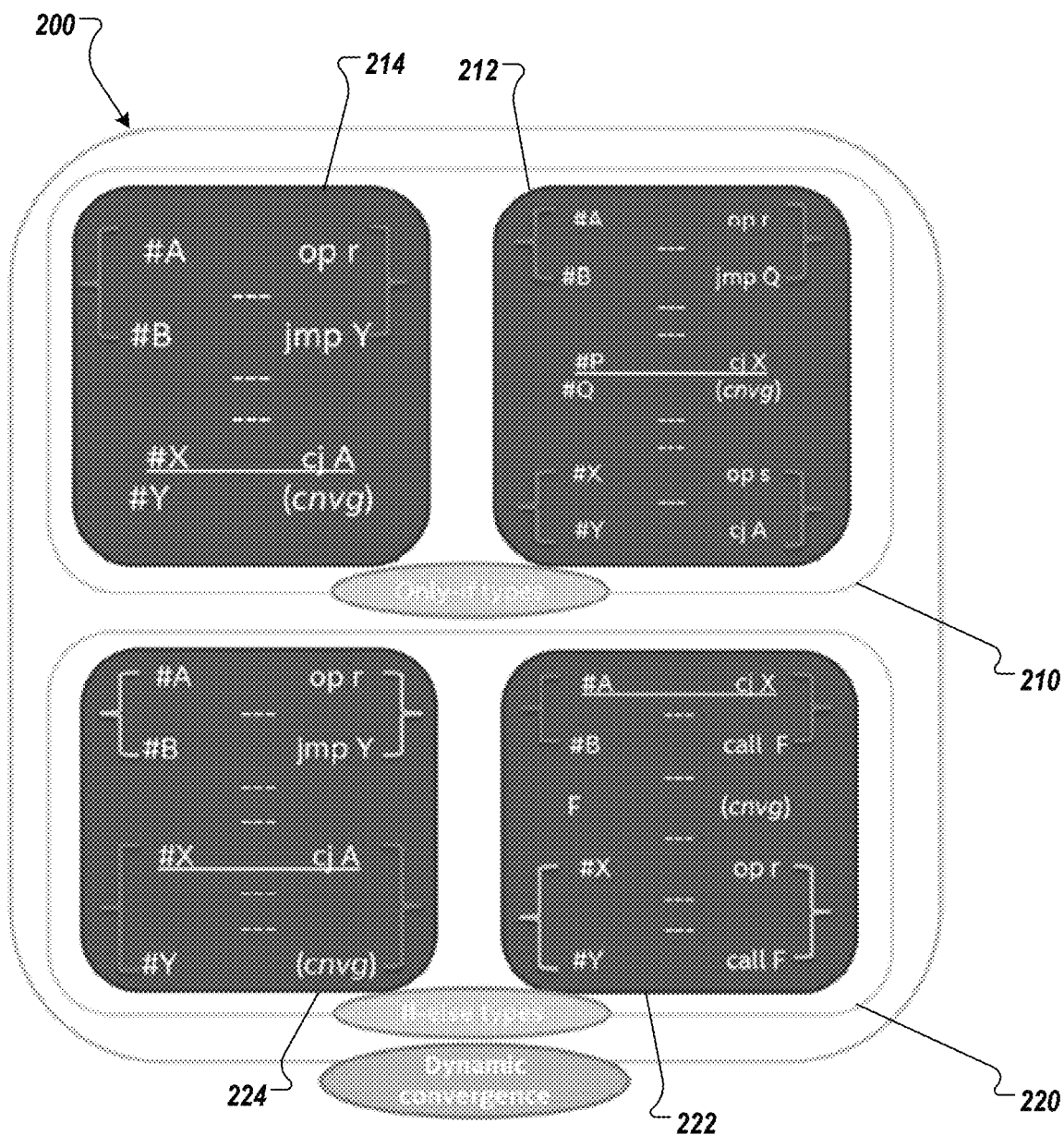
FIG. 2A illustrates a block diagram of a dynamic convergence of branches according to various embodiments.

FIG. 2A depicts various examples of dynamic convergence 200 (e.g., direct conditional branches or bi-directional conditional branches). The examples of dynamic convergence 200 include only-if types 210 and if-else types 220. It should be appreciated that ACB can detect other dynamic convergence branches other than only-if types 210 and if-else types 220. It should be appreciated that only-if types 210 can include other only-if types than depicted in FIG. 2, and if-else types 220 can include other if-else types than depicted in FIG. 2.

The examples of dynamic convergence 200 include various instructions that illustrate dynamic convergence. In FIG. 2, the underlined instructions are H2P IPs that may be utilized by ACB and the instructions associated with the "cnvg" are the convergence point IP. The labels on the left side of each example are addresses of the instructions used in the example. The dashes between instructions represent the collapsed form of any of the instructions that can exist between the two IPs in a program. Additionally, "cj" denotes conditional-jump instructions that are the type/category of the jump instructions targeted by ACB.

Only-if types 210 include example 212 and example 214. Example 214 highlights the non-contiguity in convergence cases that can exist due to rearrangement of code by the compiler. In this example, the H2P at X conditionally jumps to remote location A. At A, some operations are handled and an unconditional jump occurs at B. The H2P redirects back to meet the fall-through path at Q. This example is more complex and not as straightforward as compared to contiguous "only-if" scenarios.

Example 212 is a complex version of program control flow. The keyword "op" represents any general instruction (e.g., arithmetic, memory, or other control flow instruction) that constitutes the branch's body (control dependent region). In this example, the H2P IP directs the control flow from address P to X, which can be a small region of few instructions before the control (conditionally or unconditionally) goes to A, then to B and then (conditionally or unconditionally) back to address Q. Address Q lies on the fall-through-path of P when the branch at P is not taken. Hence, address Q can be the convergence point. The complexity and redirection encountered by the control flow in this example poses a challenge to static analysis of code segmented regions and basic blocks in compiled code.

If-else types 220 includes example 222 and example 224. Examples 222 and 224 are similar to examples 212 and 214 described above. For example, examples 212 and 214 redirect control flow to possible non-contiguous far-away parts of the program. The main distinguishing feature of the if-else types (as compared to the only-if types) is that the fall-through path can have complex redirection of control flow itself. This can make the convergence point distant from both the "if" portion and the "else" portion. In particular, example 224 represents a scenario where two different points a function provide convergence at function boundaries (the beginning address of the call or dynamic returning point respectively. The two different points can be of the same function in a program or returning from two different points in an existent called function.

Referring again to FIG. 1, branch predication circuitry 150 is communicatively coupled to at least branch IP table 130. Branch IP table 130 is communicatively coupled to branch instruction buffer 140. As described herein, branch predication circuitry 150 (in combination with at least branch IP table 130 and instruction buffer 140) is utilized for automatic predication of H2P convergent branches according to various embodiments.

Figure 2B:
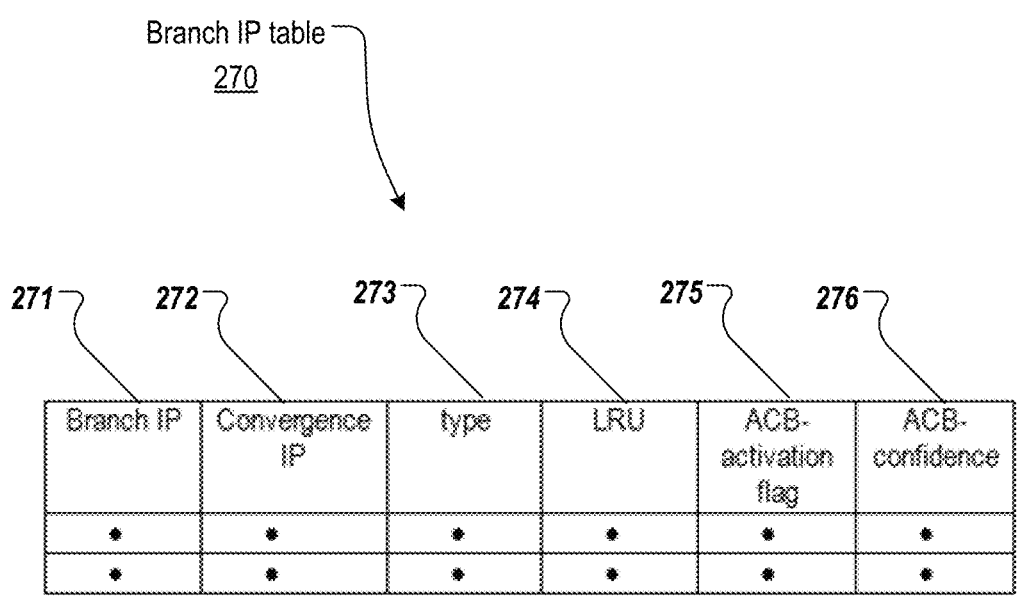
FIG. 2B illustrates a branch IP table that includes various metadata related to various branches according to various embodiments.

Branch IP table 130 stores various metadata related to various branches. In various embodiments, branch IP table 130 stores branch IP, convergence instruction IP, 'only-if' type or 'if-else' type, and least-recently-used (LRU) replacement policy weight and predictability confidence. Additionally, branch IP table 130 includes an ACB-activation flag and ACB-confidence, which enables the optimization on future instances of the dynamic occurrence of the learned H2P IPs (observed when a program is executing on the core) after being set. In one embodiment, branch IP table 130 is a small table (e.g., 32 entries). FIG. 2B depicts an embodiment of branch IP table 270 that includes various metadata related to various branches. As illustrated in FIG. 2B, the metadata recorded by branch IP table 270 may include, but is not limited to, branch IP address 217, convergence IP address 272, type of branch 273 (e.g., if-else, only-if, etc.), LRU value 274, ACB-active flag set 275, ACB-confidence value 276.

Branch instruction buffer 140 stores speculatively-fetched instructions to monitor dynamic control flow and detect convergence. The branch instruction buffer 140, in various embodiments, holds the upper limit of instruction weight that is allowed on each path (e.g., taken and not-taken paths of the instruction code) in order to limit the scope of learnable convergence patterns. In some embodiments, branch instruction buffer 140 stores up to twenty instructions for either path In various embodiments, BPU 160 includes branch predication circuitry 150. In general, BPU 160 predicts which way a branch (e.g. an if-then-else structure) will go before the direction is definitively known. When the prediction is correct, the BPU 160 improves the flow in the instruction pipeline. As described herein, BPU 160 performs the predictions of the H2P branches and uses the branch predication hardware to further provide ACB. BPU 160 (or BPU 161), in one embodiment, corresponds with BPU 732 of processor 700 (FIG. 7A).

In general, the architectural pipeline is for implementing ILP within a processor. Pipelining is utilized to keep parts of the processor busy with some instruction by dividing incoming instructions into a series of sequential steps (the "pipeline") performed by different processor units with different parts of instructions processed in parallel. An example of an architectural pipeline is depicted in FIG. 7B.

As discussed in further detail below, in various embodiments, the branch predication circuitry 150 may perform ACB by (1) detecting convergence in frequently mispredicted branches, (2) modifying front-end stages to fetch both the speculative paths, and (3) handling the fetched dual paths in OOO until branch resolution. It should be appreciated that the above-listed features are not limiting and the implementation of ACB can include more features or less features.

I. Detecting Convergence in Frequently Mispredicted Branches

Figure 3:
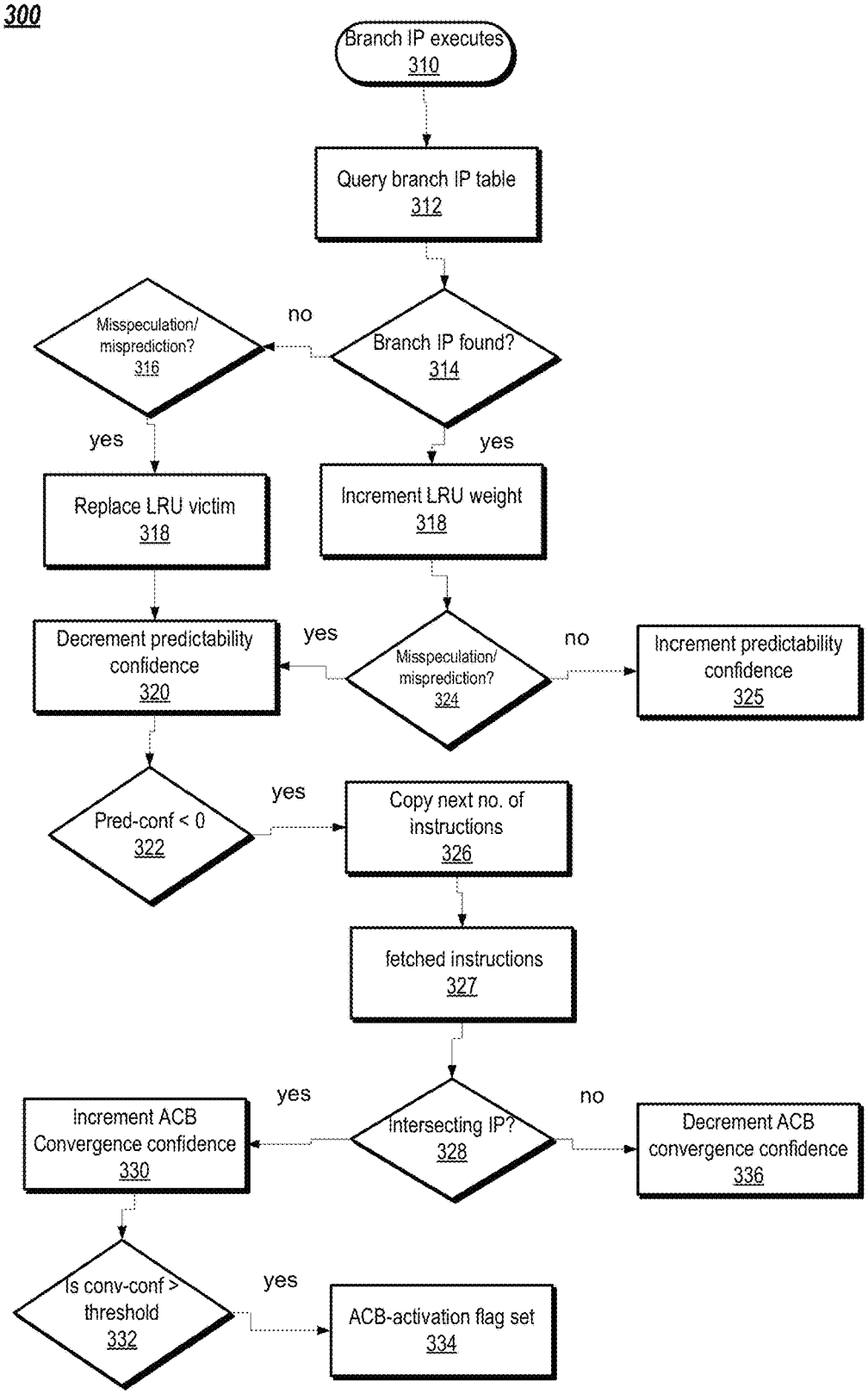
FIG. 3 illustrates a flow diagram for detecting convergence in frequently mispredicted branches according to various embodiments.

FIG. 3 is a flow diagram of a method 300 directed to detecting convergence in frequently mispredicted branches, according to various embodiments. In one embodiment, the frequently mispredicted branches utilized in method 300 are branches having an average misprediction rate that meets a predefined threshold (e.g., at least a 10% misprediction rate), as described above.

The method 300 may be performed by processing logic that may comprise hardware (e.g., circuitry, dedicated logic, programmable logic, microcode, etc.), software (such as instructions executed by the processor core(s) 110), firmware (including microcode) or a combination thereof. In one implementation, the method 300 is performed by processing device 100A of FIG. 1A, processing device 100B of FIG. 1B, processing device 100C of FIG. 1C, processing device 100D of FIG. 1D, processing device 100E of FIG. 1E, or processing device 100F of FIG. 1F. For example, method 300 may be performed by branch predication circuitry 150 described with respect to FIG. 1A. In another implementation, method 300 is performed by any of the processors described with respect to FIGS. 7A-13. Alternatively, other components of the processing devices 100A-F (or software executing on the processing devices 100A-F) may perform some or all of the operations of the method 300.

In general, method 300 constitutes the learning phase to determine candidates eligible for ACB optimization. Method 300, in various embodiments, is performed off the critical path of the pipeline (separately from the pipe line). Method 300, in various embodiments, reads from retirement order buffer (ROB) entries generated by the processor.

At 310 of method 300, a branch IP is executed. In one embodiment, when a branch results in a misprediction, the branch IP is inserted into branch IP table 130 (e.g., branch IP table 270). At 312, branch IP table 130 is queried to determine if the executed branch IP (at 310) is in the branch IP table.

At 314, if the executed branch IP is found in table 130, then, at 318, the LRU weight is incremented (at 318). In various embodiments, the LRU weight quantifies the recency of an observed branch IP instance (e.g., how often has it been recently observed). When the branch IP table is full, as a replacement strategy, the branch IP entry with the least LRU weight is evicted because by temporal locality, it is not expected to be observed again anytime soon. Upon incrementing the LRU weight, it is determined whether a CMBM has occurred (at 324).

At 314, if the executed branch IP is not found in table 130, then, at 316, it is determined whether a CMBM has occurred (at 316). It is noted that a CMBM is trigged in response to a misprediction. If a CMBM has not occurred, at 316, then it is determined that the currently observed branch occurrence has made a correct prediction (and it has not been observed to be critical to be in the IP table in the past). As a result, the IP branch is discarded as a potential ACB candidate.

If a CMBM has occurred (at 316), then the branch IP executed at 310 is entered in branch IP table 130. In other words, the branch IP executed at 310 replaces an LRU victim (at 318). Upon the branch IP entered into branch IP table 130, the predictability confidence of the branch IP is decremented at 320. For example, the ACB-confidence value is decremented in the branch IP table. Additionally, if a CMBM has occurred (at 324), then the predictability confidence of the branch IP is decremented. If a CMBM has not occurred, at 324, then the predictability confidence of the branch IP is incremented (at 325). For example, the ACB-confidence value is incremented in the branch IP table.

At 322, it is determined whether the predictability confidence of a branch IP is less than 0 (or meets a predetermined threshold). At 326, if the predictability confidence is less than 0, then a number of instructions are copied/stored into branch instruction buffer 140. For example, in various embodiments, whenever the confidence is negative (e.g., it has the predetermined minimum misprediction rate), and when a misprediction triggered a CMBM is clearing away ROB entries, a predetermined number of instructions (e.g., 20 instructions) immediately following its entry is drained as part of the speculatively fetched path into branch instruction buffer 140.

At 327, a predetermined number of instructions from the actual path are fetched. After the CMBM is complete, the pipeline has the address of the beginning of the correct path (as provided by the branch's execution) and it starts fetching from that point onwards. In this stage, the allocation of the next instructions (e.g., 20 instructions) immediately following the CMBM are monitored. In one embodiment, when the actual correct path is being fetched, a counter is used which counts up to 20 instructions. A counter is a persistent counter stored in the IP branch table. At 328, it is determined whether there is an IP intersection by querying the IPs in the branch instruction buffer 140.

At 330, if a matching IP is found, it becomes the point of convergence for this instance and is recorded in branch IP table 130 and the ACB confidence is incremented. At 336, if the convergence is not found for an already existing entry, then ACB confidence is decremented. The incrementing/decrementing of the ACB confidence allows for the convergent control flow for the converged branch (in most cases). At 332, it is determined whether the ACB-confidence reaches a threshold. If it is determined that the ACB confidence does not reach the threshold, the branch IP stays in the branch IP table with the ACB-activation flag unset. It is noted that ACB cannot be applied to occurrences of IPs in the branch IP table until the IP is activated. For activation, the confidence associated with each entry is positive and also reach a predetermined threshold. At 334, when the threshold has been reached, the ACB-activation flag is set. For example, the ACB-activation flag is set in the branch IP table. Upon the activation flag being set, other features are implemented for the automatic predication of convergent branches, such as modifying front-end stages to fetch both the speculative paths, and handling the fetched dual paths in OOO until branch resolution, which is described in further detail below.

II. Modifying Front-End Stages to Fetch Both the Speculative Paths

Figure 4:
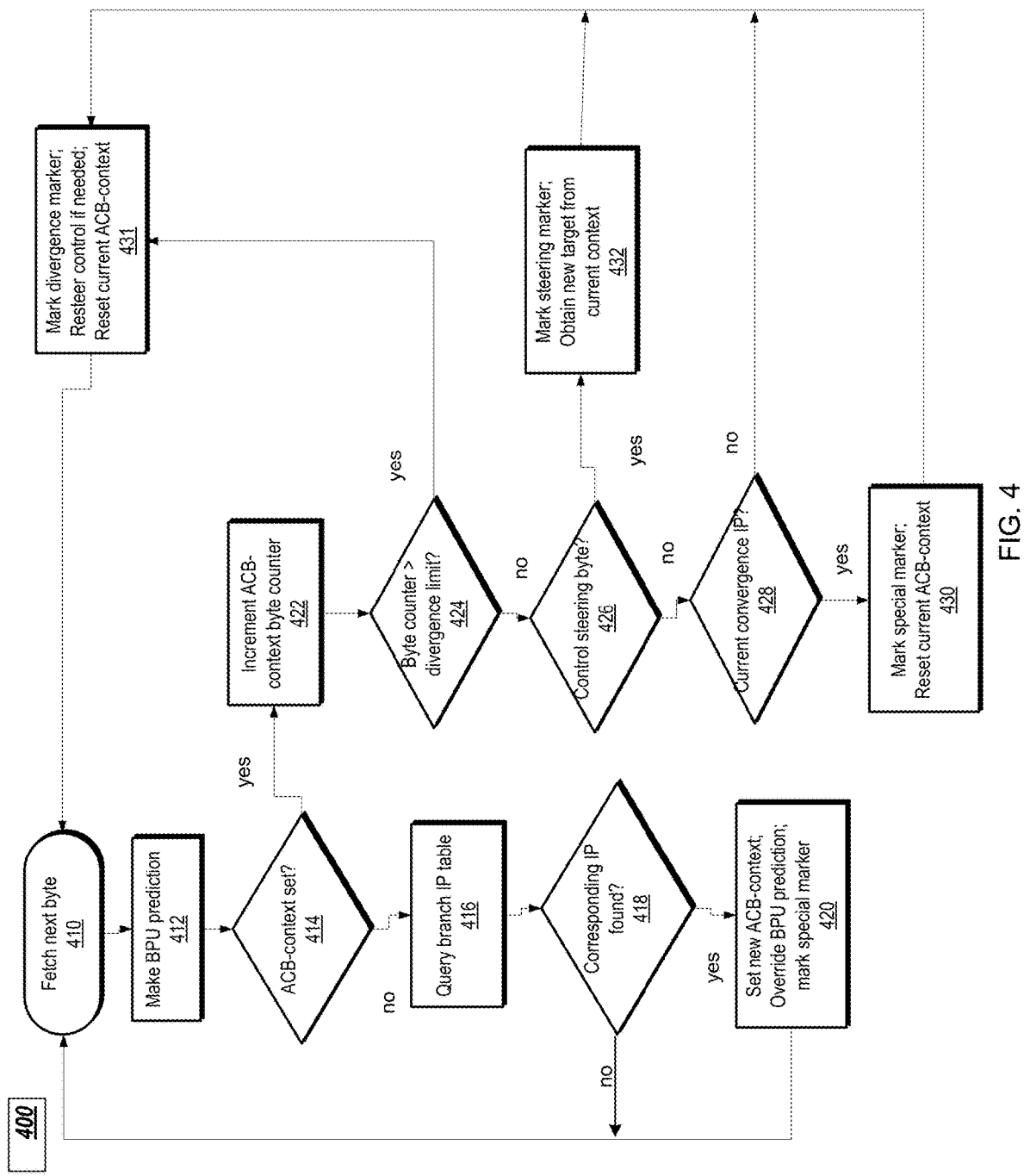
FIG. 4 illustrates a flow diagram for modifying front-end stages to fetch both the speculative according to various embodiments.

FIG. 4 depicts a method 400 directed to modifying front-end stages to fetch both the speculative paths. In one embodiment, method 400 actively monitors H2P branches and dynamically detects control flow convergence.

The method 400 may be performed by processing logic that may comprise hardware (e.g., circuitry, dedicated logic, programmable logic, microcode, etc.), software (such as instructions executed by the processor core(s) 110), firmware (including microcode) or a combination thereof. In one implementation, the method 400 is performed by processing device 100A of FIG. A1 (or any one of processing devices 100B-100F) For example, method 400 may be performed by branch predication circuitry 150 described with respect to FIG. 1. In some embodiments, method 400 may be performed by a combination of branch predication circuitry 150 and BPU 160. In another implementation, method 400 is performed by any of the processors described with respect to FIGS. 7A-13. Alternatively, other components of the processors 100A-100F (or software executing on the processing devices 100A-100F) may perform some or all of the operations of the method 400.

At 410 of method 400, the BPU (e.g., BPU 160) invokes its prediction algorithm on a per-byte basis for the instructions by fetching a newt byte in a path. At 412, the BPU makes a prediction. The prediction, in various embodiments, is a binary decision as provided by the table entries in the branch prediction tables and utilizing the current history and the branch IP byte. At 414, it is determined whether the ACB-context is set (or open). An ACB-context is a globally accessible structure (e.g., group of registers) in the BPU. ACB-context are unset (or closed) by default. Upon querying the branch IP table and finding an "activated" entry corresponding to the byte being processed by the BPU, the ACB-context is set. It is set using the same fields (stored in the branch IP table).

At 416 and 418, if the ACB-context has not been set, then a parallel query of table 130 is performed to determine if there is a corresponding IP activated for ACB in table 130.

If a corresponding entry is not found in the branch IP table, at 418, then method 400 returns to fetching the next byte (at 410).

At 420, if a corresponding entry is found in the branch IP table, the original BPU prediction for this IP's byte is overridden. Additionally, the BPU is resteered to fetch the first speculative path, which is described in further detail below. The setting of a new ACB-context and the special marking are done in the BPU (of the group of registers denoting the ACB-context. The special marking is the setting a field in the instruction byte that is normally forwarded by the BPU to the later stages of instructions fetching and decode. It is noted that the branch IP table is queried for supplying fields which are copied to the registers in the BPU. The resteering is deterministically (and not using BPU's prediction) overwriting the next to be processed byte to the beginning of the first path.

Upon completion of 420, steps 410-414 are completed again, as described above. If the ACB-context is set at 414, then, at 422, the ACB-context byte counter is incremented. The ACB-context byte counter is one of the registers in the group of registers denoting ACB-context.

At 424, it is determined whether the byte counter is greater than the divergence limit. If the byte counter is greater than the divergence limit, then at 431, the divergence marker is marked, and the current ACB-context is reset. That is, a convergence byte (expected to be observed) was not observed upon an ACB-context being set. As a result, ACB no longer is applied. The current observation is abandoned by resetting. It is noted that BPU resteering may eventually occur when the diverging branch instance triggers a CMBM later in the pipeline.

If the byte counter is less than the divergence limit, then at 426, it is determined whether there is a control steering byte. The control steering byte is the ending/last byte on the first speculative path. This denotes completion of fetching one of the two speculative paths. As a result, the BPU makes a jump to the address/IP of the beginning of the other path. If there is a control steering byte, then at 432, a steering marker is marked, and a new target is obtained from the current context. The beginning of the other path is a register in the group of registers of the BPU that is computed when the ACB-context is set.

If is determined that there is not a control steering byte, then at 428, it is determined if there is a current convergence IP. If a convergence IP is not determined, then method 400 proceeds to step 431, as described above. If a convergence IP is determined, then, at 430, a special marker is marked and the current ACB-context is reset. In various embodiments, this is the conclusive step in the ACB-context management in the BPU. It indicates that a convergence point (as expected and observed in past learnings from the branch IP table) has been successfully reached. It is noted that the reconvergence point is supplied and copied into the ACB-context variable upon table query.

As described herein, automatic prediction of H2P convergent branches (ACB handles dynamic convergence. The dynamic convergence can be, in some embodiments, due to the presence of intermediate branches with the ACB body. As such, the dynamic convergence can dynamically steer the control flow in directions that have not been recorded in the past. For example, the dynamic convergence can cause the convergence IP (that has been previously observed) to not arrive (or be observed again). As a result, a divergence may occur.

In some embodiments, convergence of control flow may be ensured by a variable in this ACB-context which counts the number of bytes observed as belonging to the body of an ACB-able IP. If this byte counter exceeds a certain tuned threshold before finding a convergence point (e.g., step 424), it assumed that there is a deviation from the expected or past-observed control flow. As such, a divergence may occur.

When a divergence is confirmed, the handling of dynamic convergence by automatic predication of H2P convergent branches is not or cannot be performed. In various embodiments, a divergence can be handled by (1) forcing a CMBM or (2) having the possibility of a CMBM but not forcing a CMBM.

In regards to forcing a CMBM, a special marker indicating divergence is sent (e.g., 431 of FIG. 4). This causes the corresponding ACB-IP instance to inject a CMBM after computation of its actual taken path based on its arguments (e.g., at 520 of FIG. 5). In some instances, the CMBM is forced when an actually chosen path has not been able to be completely fetched.

In regards to not forcing a CMBM, if one of the speculative paths which the BPU's original prediction suggested is completely fetched, then the control flow of the diverged direction to the convergence point is resteered It should be appreciated that if the direction computed after branch resolution is correct, then there is a possibility of saving a CMBM by converting the fetched uops on the wrong path to no-ops. This is also done for a properly convergent ACB.

If the path contrary to the BPU's original decision (when a divergence is triggered), then the control is resteered similarly to the beginning of the other "expected" speculative path (e.g., 431 of FIG. 4). This is done by assuming that the prediction by the BPU is correct and the other partially fetched/unexpected uops will turn to no-ops. It is noted that if the original prediction by the BPU is incorrect, then the misprediction penalty still occurs.

In various embodiments, ACB-able IP instances and their corresponding branch bodies of the two fetched paths are recognized by monitoring a special marker field at a decoded instructions queue prior to OOO allocation. Stateful variables representing the independent ACB-context are utilized to mark and predicate the speculative paths dynamically as additional fields in the decoded uops. The marker field is translated first from the instruction bytes during BPU prediction to the instruction object during instruction decode, and eventually as part of uops which are fabricated by the pipeline/micro-architecture for execution. The marker field it is a field of few bits which are associated with the bytes, instructions and uops, implemented in a manner similar to the BPU's predicted taken/not-taken decision and is progressively transferred along the processor pipeline.

Upon receiving an ACB-context opening marker, the fields with this IP instance ID are set. The decoded uops following this marker and before the resteering marker are predicated with this IP instance ID as belonging to this ACB-body and also belonging to the first speculative path.

Upon receiving the resteering marker, the end of the first speculative path is identified and the following uops as belonging to the other path are marked Upon a convergence, the state variables are reset, similar to BPU's ACB-context behavior.

Also, the ACB-able branch IP is sent a flag into the OOO which stalls the branch from getting dispatched for execution it until convergence point uop is seen in the IDQ. If a divergence marker is seen (instead of a context closing), then the waiting branch is unstalled and proceeds for execution. This is done after setting another flag indicating divergence, which allows it to CMBM if needed.

III. Handling the Fetched Dual Paths in OOO Until Branch Resolution

From the decoded instruction queue (as discussed above), the decoded uops move into OOO for allocation after getting renamed and assigned Physical Register File (PRF) entries and in-order position in ROB. Using the predication flags marked from the decoded instructions queue, the ACB-able uops are prevented from being scheduled and, hence, dispatched from the Reservation Station (RS).

Upon branch resolution of the ACB-IP, the predication bit is reset. Using the actual taken direction computed after branch execution, the ROB entries from ACB-IP's ROB entry are traversed sequentially. Additionally, the uops on the correct path and uops on the wrong path are identified.

The correct uops are unstalled (e.g., resumed) and go through the further stages of the pipeline as any other normal uop. Uops on the wrong (e.g., not taken) path that do not produce any live-out register are not sent for execution and all their occupied resources are immediately reclaimed (e.g. RS entry, PRF entry, port binding, etc.) except ROB entry, which is freed in-order upon retirement. They behave as "no-ops" in the later stages of the pipeline. Uops on the wrong path which produce some live-out register are converted to "mov psrcextra, pdst" uops to ensure "Register Transparency". $Psrc_{extra}$ is a modification that is performed for the speculatively fetched body uops when decoding and constructing uops. $Psrc_{extra}$ is an additional logical/architectural register value along with the existing sources used for dealing with ACB-body uops and is set as the logical/architectural destination of this instruction/uop.

Regarding register transparency, fetching both the speculative paths generates a problem as a side-effect of in-order renaming. To preserve true data dependencies and eliminate false dependencies which hinder instruction level parallelism, register renaming and allocation occurs. Therefore, upon fetching dual paths, the uops sequentially following the ACB-body get truly dependent on the live-out registers of the later fetched path, which would have been correct if the actual taken decision turned out to be the latter path. However, if the former fetched path turns out to the actual correct path, then these true dependencies cause incorrect data-values to be received at the source of post-ACB-body uops. The same situation can occur for data-dependencies being established between the two fetched paths.

To remove this side-effect, eliminating these uops on the wrong path is not sufficient. The data that was supposed to be produced by the last correct register live-out before this wrong path is rectified. This is achieved by converting the data to different operations (e.g., "mov $psrc_{extra}$, pdst" operations). $Psrc_{extra}$ is another modification that is performed for the speculatively fetched body uops when decoding and constructing uops.

Specifically, the renaming and register allocation serves the purpose of recording the PRF entry location of the last correct writer to the logical destination as $psrc_{extra}$. When the uops on the wrong path are converted to no-ops after ACB-IP branch's resolution, we refer to the PRF entry value stored in this field of the uop referred to and data is fetched from it when the last correct pdst-writer has written to this entry. Until this rectification and copying of data happens, these 'mov' converted uops do not get RS-dispatched (due to being truly dependent on $psrc_{extra}$ as an extra source). As a result, the post-ACB true 'pdst' data dependent uops are consequently stalled as well. RS-scheduling is slightly modified as well to account for this $psrc_{extra}$ dependency for ACB-no-ops and not for uops on the correct path which gets scheduled normally.

In various embodiments, load uops and store-address uops are allowed to be normally scheduled and dispatched upon allocation in OOO (irrespective of ACB-branch resolution and their belonging to the wrong path). Load Buffer (LB) and Store Buffer (SB) entries belonging to ACB-converted-no-ops are also reclaimed without performing any load/store issue to Data Cache Unit (DCU). Execution of store-address uops improves performance bottlenecks due to memory disambiguation. Store-data uops are blocked like other uops until branch execution since they cannot be issued until proven on the correct path. Load uops need to be dispatched as this is a needed condition in architecture override. This is done free associated LB entries.

Figure 5:
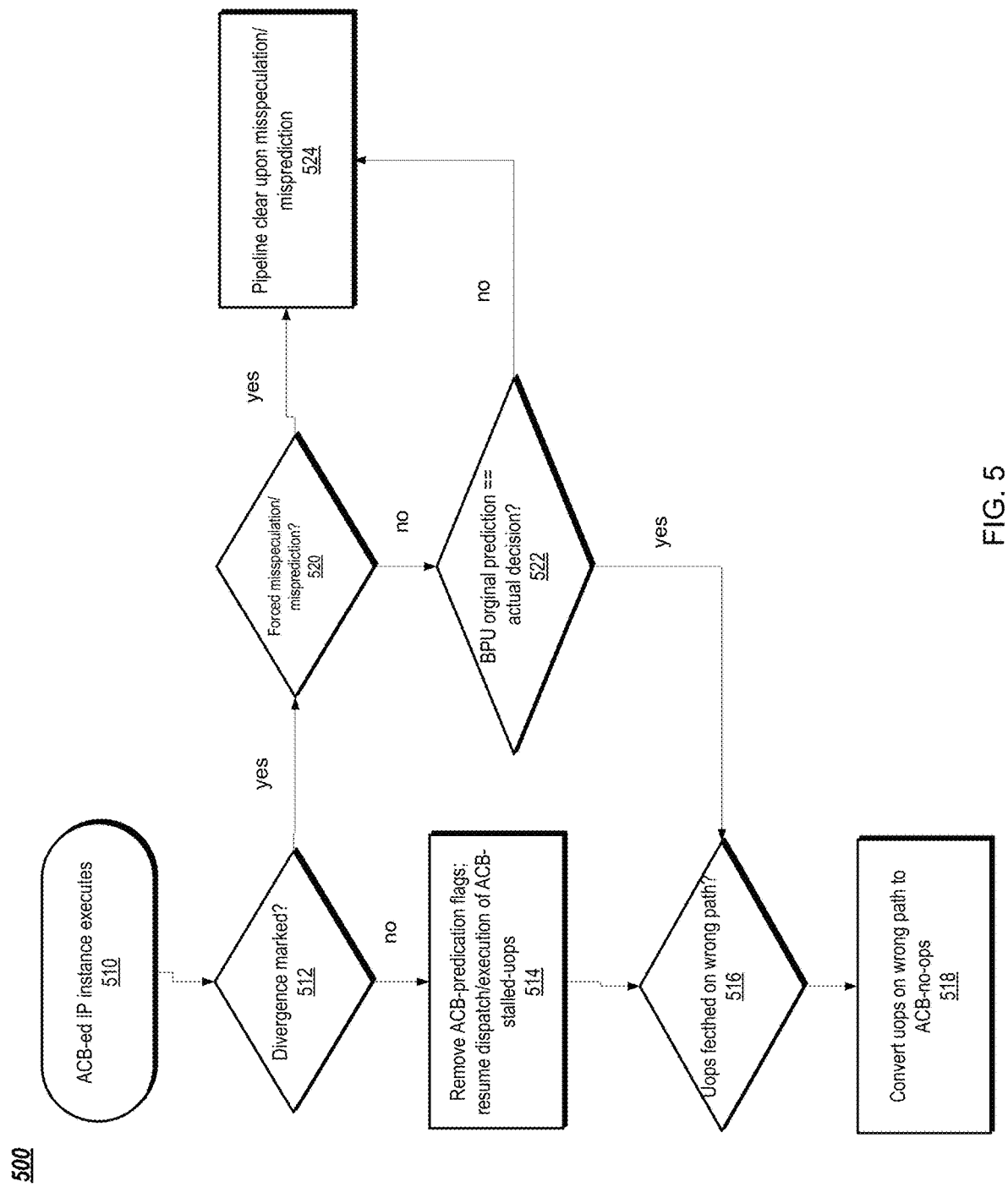
FIG. 5 illustrates a flow diagram for handling the fetched dual paths until branch resolution according to various embodiments.

FIG. 5 depicts a method 500 directed to handling the fetched dual paths in OOO until branch resolution according to various embodiments. More specifically, method 500 is directed to the saving of a CMBM(s) both in case of convergence and divergence and the consequent conversion of ACB-no-ops to 'mov' uops.

The method 500 may be performed by processing logic that may comprise hardware (e.g., circuitry, dedicated logic, programmable logic, microcode, etc.), software (such as instructions executed by the processor core(s) 110), firmware (including microcode) or a combination thereof. In one implementation, the method 500 is performed by processing device 100A of FIG. 1A (or by any of the processing devices 100B-100F). For example, method 500 may be performed by branch predication circuitry 150 described with respect to FIG. 1A. In another implementation, method 500 is performed by any of the processors described with respect to FIGS. 7A-13. Alternatively, other components of the processing devices 100A-F (or software executing on the processing devices 100A-F) may perform some or all of the operations of the method 500.

At 510, an ACB-ed IP instance executes. At 512, it is determined whether the divergence is marked at the decoded instructions queue. If the divergence is not marked at the decoded instructions queue, then at 514, the jump execution unit (JEU) set prediction flags (e.g., ACB-predication flags) are removed, and the dispatch and execution of ACB-stalled uops are unstalled (or resumed). That is, the fields set in the decoded instruction queue to postpone the scheduling of uops (for dispatch for execution) belonging to the ACB-resolution-dependent region. The JEU is a module/unit that is a part of the processor architecture and a stage in the pipeline which caters to the execution of branch instructions and provides the resolution (e.g., actual taken/not-taken decision). At 516, it is determined if the uops are fetched from the wrong path. At 518, if the uops are fetched from the wrong path, then the wrong path uops are converted to ACB-no-ops (e.g., converted to move $psrc_{extra}$, pdst), as described above.

If the marked divergence is marked at the decoded instructions queue, then at 520, it is determined whether CMBM is forced by ACB. If a CMBM is forced by ACB, then at 524, a standard pipeline clear is performed upon CMBM. However, if CMBM is not forced by ACB, then at 522, it is determined whether the BPU original decision is the actual decision. If the BPU original decision is not the actual decision, then a control flow is reset, at 524. If the BPU original decision is the actual decision, then method 500 proceeds to step 516.

FIG. 6 is a block diagram of method 600 for automatic predication of hard-to-predict convergent branches according to various embodiments. The method 600 may be performed by processing logic that may comprise hardware (e.g., circuitry, dedicated logic, programmable logic, microcode, etc.), software (such as instructions executed by the processor core(s) 110), firmware (including microcode) or a combination thereof. In one implementation, the method 600 is performed by processing device 100A of FIG. 1A. For example, method 600 may be performed by branch predication circuitry 150 described with respect to FIG. 1A. In another implementation, method 600 is performed by any of the processors described with respect to FIGS. 7A-13. Alternatively, other components of the processing devices 100A-F (or software executing on the processing devices 100A-F) may perform some or all of the operations of the method 600.

At 610, a dynamic convergence point in a direct conditional branch is determined. For example, method 300 of FIG. 3, determines a dynamic convergence IP in a direct conditional branch.

At 620, the dynamic convergence point is stored in a branch IP table. For example, a determined dynamic converge IP is then stored in branch IP table 130.

At 630, a first speculative path and a second speculative path of the direct conditional branch are fetched. For example, method 400 of FIG. 4, fetches both the first speculative path and the second speculative path.

At 640, while determining which of the first speculative path and the second speculative path is a correct path of the direct conditional branch, scheduling of instructions of the first speculative path and the second speculative path is stalled.

At 650, in response to determining that one of the first speculative path and the second speculative path is the correct path, scheduling of the instructions of the correct path is resumed.

FIG. 7A is a block diagram illustrating a micro-architecture for a processor 700 (e.g., one of processing devices 100A-F) that implements the processing device including heterogeneous cores in accordance with one embodiment of the disclosure. Specifically, processor 700 depicts an in-order architecture core and a register renaming logic, out-of-order issue/execution logic to be included in a processor according to at least one embodiment of the disclosure. In various embodiments, processor 700 can perform automatic prediction of hard-to-predict convergent branches as described herein. Additionally, processor 700, in various embodiments, is the same as any one of processing devices 100A-F.

Processor 700 includes a front end unit 730 coupled to an execution engine unit 750, and both are coupled to a memory unit 770. The processor 700 may include a reduced instruction set computing (RISC) core, a complex instruction set computing (CISC) core, a very long instruction word (VLIW) core, or a hybrid or alternative core type. As yet another option, processor 700 may include a special-purpose core, such as, for example, a network or communication core, compression engine, graphics core, or the like. In one embodiment, processor 700 may be a multi-core processor or may be part of a multi-processor system.

The front end unit 730 includes a branch prediction unit (BPU) 732 coupled to an instruction cache unit 734, which is coupled to an instruction translation lookaside buffer (TLB) 736, which is coupled to an instruction fetch unit 738, which is coupled to a decode unit 740. In one embodiment, BPU 732 is the same as BPU 160 described with respect to at least FIG. 1A (or BPU 161). The decode unit 740 (also known as a decoder) may decode instructions, and generate as an output one or more micro-operations, micro-code entry points, microinstructions, other instructions, or other control signals, which are decoded from, or which otherwise reflect, or are derived from, the original instructions. The decoder 740 may be implemented using various different mechanisms. Examples of suitable mechanisms include, but are not limited to, look-up tables, hardware implementations, programmable logic arrays (PLAs), microcode read only memories (ROMs), etc. The instruction cache unit 734 is further coupled to the memory unit 770. The decode unit 740 is coupled to a rename/allocator unit 752 in the execution engine unit 750.

The execution engine unit 750 includes the rename/allocator unit 752 coupled to a retirement unit 754 and a set of one or more scheduler unit(s) 756. The scheduler unit(s) 756 represents any number of different schedulers, including reservations stations (RS), central instruction window, etc. The scheduler unit(s) 756 is coupled to the physical register file(s) unit(s) 758. Each of the physical register file(s) units 758 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 758 is overlapped by the retirement unit 754 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.).

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 754 and the physical register file(s) unit(s) 758 are coupled to the execution cluster(s) 760. The execution cluster(s) 760 includes a set of one or more execution units 762 and a set of one or more memory access units 764. The execution units 762 may perform various operations (e.g., shifts, addition, subtraction, multiplication) and operate on various types of data (e.g., scalar floating point, packed integer, packed floating point, vector integer, vector floating point).

While some embodiments may include a number of execution units dedicated to specific functions or sets of functions, other embodiments may include only one execution unit or multiple execution units that all perform all functions. The scheduler unit(s) 756, physical register file(s) unit(s) 758, and execution cluster(s) 760 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 764). It should also be understood that where separate pipelines are used, one or more of these pipelines may be out-of-order issue/execution and the rest in-order.

The set of memory access units 764 is coupled to the memory unit 770, which may include a data prefetcher 780, a data TLB unit 772, a data cache unit (DCU) 774, and a level 2 (L2) cache unit 776, to name a few examples. In some embodiments DCU 774 is also known as a first level data cache (L1 cache). The DCU 774 may handle multiple outstanding cache misses and continue to service incoming stores and loads. It also supports maintaining cache coherency. The data TLB unit 772 is a cache used to improve virtual address translation speed by mapping virtual and physical address spaces. In one exemplary embodiment, the memory access units 764 may include a load unit, a store address unit, and a store data unit, each of which is coupled to the data TLB unit 772 in the memory unit 770. The L2 cache unit 776 may be coupled to one or more other levels of cache and eventually to a main memory.

In one embodiment, the data prefetcher 780 speculatively loads/prefetches data to the DCU 774 by automatically predicting which data a program is about to consume. Prefetching may refer to transferring data stored in one memory location of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

The processor 700 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes a separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

FIG. 7B is a block diagram illustrating an in-order pipeline and a register renaming stage, out-of-order issue/execution pipeline implemented by processor 700 of FIG. 7A according to some embodiments of the disclosure. The solid lined boxes in FIG. 7B illustrate an in-order pipeline, while the dashed lined boxes illustrates a register renaming, out-of-order issue/execution pipeline. In FIG. 7B, a processor 700 as a pipeline includes a fetch stage 702, a length decode stage 704, a decode stage 706, an allocation stage 708, a renaming stage 710, a scheduling (also known as a dispatch or issue) stage 712, a register read/memory read stage 714, an execute stage 716, a write back/memory write stage 718, an exception handling stage 722, and a commit stage 724. In some embodiments, the ordering of stages 702-724 may be different than illustrated and are not limited to the specific ordering shown in FIG. 7B.

Figure 8:
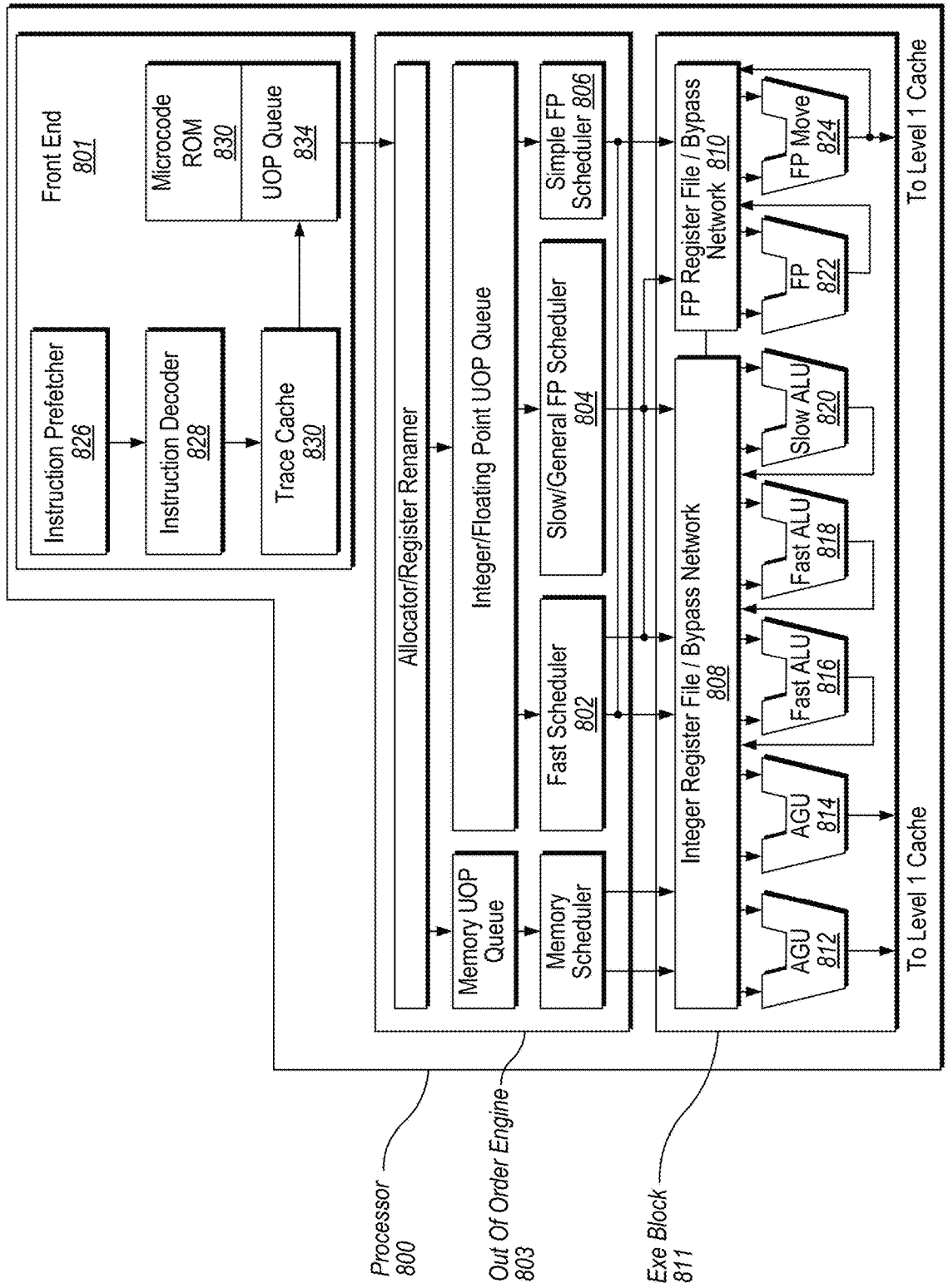
FIG. 8 is a block diagram illustrating a micro-architecture for a processor in accordance with one embodiment of the disclosure.

FIG. 8 illustrates a block diagram of the micro-architecture for a processor 800 that includes hybrid cores in accordance with one embodiment of the disclosure. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 801 is the part of the processor 800 that fetches instructions to be executed and prepares them to be used later in the processor pipeline. In various embodiments, processor 800 can perform automatic prediction of hard-to-predict convergent branches as described herein. Additionally, processor 800, in various embodiments, is the same as any one of processing devices 100A-F.

The front end 801 may include several units. In one embodiment, the instruction prefetcher 826 fetches instructions from memory and feeds them to an instruction decoder 828 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 830 takes decoded uops and assembles them into program ordered sequences or traces in the uop queue 834 for execution. When the trace cache 830 encounters a complex instruction, the microcode ROM 832 provides the uops needed to complete the operation.

Some instructions are converted into a single micro-op, whereas others need several micro-ops to complete the full operation. In one embodiment, if more than four micro-ops are needed to complete an instruction, the decoder 828 accesses the microcode ROM 832 to do the instruction. For one embodiment, an instruction can be decoded into a small number of micro ops for processing at the instruction decoder 828. In another embodiment, an instruction can be stored within the microcode ROM 832 should a number of micro-ops be needed to accomplish the operation. The trace cache 830 refers to an entry point programmable logic array (PLA) to determine a correct micro-instruction pointer for reading the micro-code sequences to complete one or more instructions in accordance with one embodiment from the micro-code ROM 832. After the microcode ROM 832 finishes sequencing micro-ops for an instruction, the front end 801 of the machine resumes fetching micro-ops from the trace cache 830.

The out-of-order execution engine 803 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 802, slow/general floating point scheduler 804, and simple floating point scheduler 806. The uop schedulers 802, 804, 806, determine when a uop is ready to execute based on the readiness of their dependent input register operand sources and the availability of the execution resources the uops need to complete their operation. The fast scheduler 802 of one embodiment can schedule on each half of the main clock cycle while the other schedulers can only schedule once per main processor clock cycle. The schedulers arbitrate for the dispatch ports to schedule uops for execution.

Register files 808, 810, sit between the schedulers 802, 804, 806, and the execution units 812, 814, 816, 818, 820, 822, 824 in the execution block 811. There is a separate register file 808, 810, for integer and floating point operations, respectively. Each register file 808, 810, of one embodiment also includes a bypass network that can bypass or forward just completed results that have not yet been written into the register file to new dependent uops. The integer register file 808 and the floating point register file 810 are also capable of communicating data with the other. For one embodiment, the integer register file 808 is split into two separate register files, one register file for the low order 32 bits of data and a second register file for the high order 32 bits of data. The floating point register file 810 of one embodiment has 128 bit wide entries because floating point instructions typically have operands from 64 to 128 bits in width.

The execution block 811 contains the execution units 812, 814, 816, 818, 820, 822, 824, where the instructions are actually executed. This section includes the register files 808, 810, that store the integer and floating point data operand values that the micro-instructions need to execute. The processor 800 of one embodiment is comprised of a number of execution units: address generation unit (AGU) 812, AGU 814, fast ALU 816, fast ALU 818, slow ALU 820, floating point ALU 822, floating point move unit 824. For one embodiment, the floating point execution blocks 822, 824, execute floating point, MMX, SIMD, and SSE, or other operations. The floating point ALU 822 of one embodiment includes a 64 bit by 64 bit floating point divider to execute divide, square root, and remainder micro-ops. For embodiments of the present disclosure, instructions involving a floating point value may be handled with the floating point hardware.

In one embodiment, the ALU operations go to the high-speed ALU execution units 816, 818. The fast ALUs 816, 818, of one embodiment can execute fast operations with an effective latency of half a clock cycle. For one embodiment, most complex integer operations go to the slow ALU 820 as the slow ALU 820 includes integer execution hardware for long latency type of operations, such as a multiplier, shifts, flag logic, and branch processing. Memory load/store operations are executed by the AGUs 812, 814. For one embodiment, the integer ALUs 816, 818, 820, are described in the context of performing integer operations on 64 bit data operands. In alternative embodiments, the ALUs 816, 818, 820, can be implemented to support a variety of data bits including 16, 32, 128, 256, etc. Similarly, the floating point units 822, 824, can be implemented to support a range of operands having bits of various widths. For one embodiment, the floating point units 822, 824, can operate on 128 bits wide packed data operands in conjunction with SIMD and multimedia instructions.

In one embodiment, the uops schedulers 802, 804, 806, dispatch dependent operations before the parent load has finished executing. As uops are speculatively scheduled and executed in processor 800, the processor 800 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The processor 800 also includes logic to implement store address prediction for memory disambiguation according to embodiments of the disclosure. In one embodiment, the execution block 811 of processor 800 may include a store address predictor (not shown) for implementing store address prediction for memory disambiguation.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data.

For the discussions below, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 9:
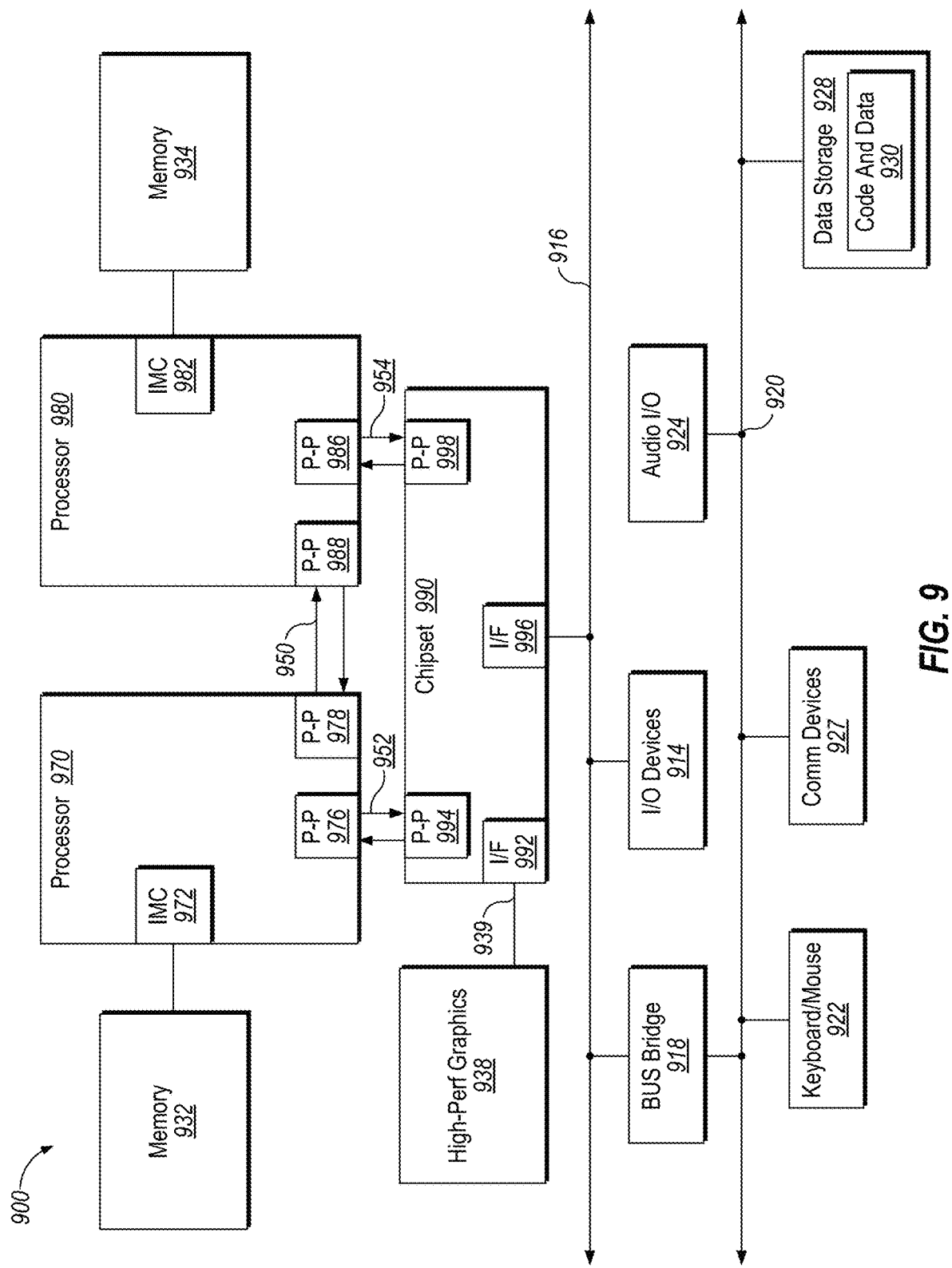
FIG. 9 is a block diagram illustrating a system in which an embodiment of the disclosure may be used.

Referring now to FIG. 9, shown is a block diagram illustrating a system 900 in which an embodiment of the disclosure may be used. As shown in FIG. 9, multiprocessor system 900 is a point-to-point interconnect system, and includes a first processor 970 and a second processor 980 coupled via a point-to-point interconnect 950. While shown with only two processors 970, 980, it is to be understood that the scope of embodiments of the disclosure is not so limited. In other embodiments, one or more additional processors may be present in a given processor. In one embodiment, the multiprocessor system 900 may implement hybrid cores as described herein. In various embodiments, processor 970 and/or processor 980 can perform automatic prediction of hard-to-predict convergent branches as described herein. Additionally, processor 970 or processor 980, in various embodiments, is the same as processing device 100.

Processors 970 and 980 are shown including integrated memory controller units 972 and 982, respectively. Processor 970 also includes as part of its bus controller units point-to-point (P-P) interfaces 976 and 978; similarly, second processor 980 includes P-P interfaces 986 and 988. Processors 970, 980 may exchange information via a point-to-point (P-P) interface 950 using P-P interface circuits 978, 988. As shown in FIG. 9, IMCs 972 and 982 couple the processors to respective memories, namely a memory 932 and a memory 934, which may be portions of main memory locally attached to the respective processors.

Processors 970, 980 may each exchange information with a chipset 990 via individual P-P interfaces 952, 954 using point to point interface circuits 976, 994, 986, 998. Chipset 990 may also exchange information with a high-performance graphics circuit 938 via a high-performance graphics interface 939.

A shared cache (not shown) may be included in either processor or outside of both processors, yet connected with the processors via P-P interconnect, such that either or both processors' local cache information may be stored in the shared cache if a processor is placed into a low power mode.

Chipset 990 may be coupled to a first bus 916 via an interface 996. In one embodiment, first bus 916 may be a Peripheral Component Interconnect (PCI) bus, or a bus such as a PCI Express bus or another third generation I/O interconnect bus, although the scope of the present disclosure is not so limited.

As shown in FIG. 9, various I/O devices 914 may be coupled to first bus 916, along with a bus bridge 918 which couples first bus 916 to a second bus 920. In one embodiment, second bus 920 may be a low pin count (LPC) bus. Various devices may be coupled to second bus 920 including, for example, a keyboard and/or mouse 922, communication devices 927 and a storage unit 928 such as a disk drive or other mass storage device which may include instructions/code and data 930, in one embodiment. Further, an audio I/O 924 may be coupled to second bus 920. Note that other architectures are possible. For example, instead of the point-to-point architecture of FIG. 9, a system may implement a multi-drop bus or other such architecture.

Figure 10:
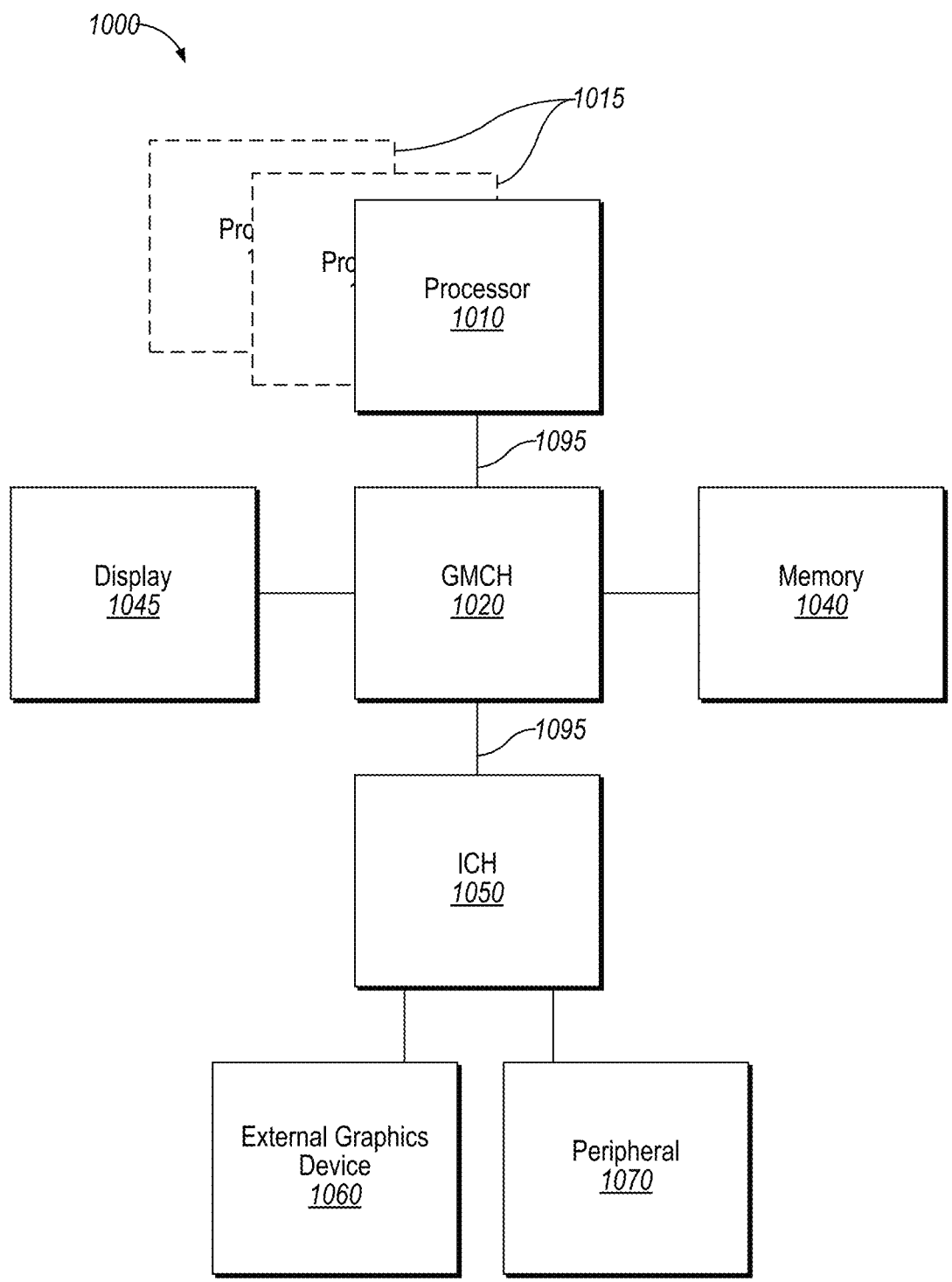
FIG. 10 is a block diagram illustrating a system in which an embodiment of the disclosure may operate.

Referring now to FIG. 10, shown is a block diagram of a system 1000 in which one embodiment of the disclosure may operate. The system 1000 may include one or more processors 1010, 1015, which are coupled to graphics memory controller hub (GMCH) 1020. The optional nature of additional processors 1015 is denoted in FIG. 10 with broken lines. In one embodiment, processors 1010, 1015 implement hybrid cores according to embodiments of the disclosure.

Each processor 1010, 1015 may be some version of the circuit, integrated circuit, processor, and/or silicon integrated circuit as described above. However, it should be noted that it is unlikely that integrated graphics logic and integrated memory control units would exist in the processors 1010, 1015. FIG. 10 illustrates that the GMCH 1020 may be coupled to a memory 1040 that may be, for example, a dynamic random access memory (DRAM). The DRAM may, for at least one embodiment, be associated with a non-volatile cache. In various embodiments, one or more of processors 1010 and 1015 can perform automatic prediction of hard-to-predict convergent branches as described herein. Additionally, any one of processors 1010 and 1015, in various embodiments, is the same as any one of processing devices 100A-F.

The GMCH 1020 may be a chipset, or a portion of a chipset. The GMCH 1020 may communicate with the processor(s) 1010, 1015 and control interaction between the processor(s) 1010, 1015 and memory 1040. The GMCH 1020 may also act as an accelerated bus interface between the processor(s) 1010, 1015 and other elements of the system 1000. For at least one embodiment, the GMCH 1020 communicates with the processor(s) 1010, 1015 via a multi-drop bus, such as a frontside bus (FSB) 1095.

Furthermore, GMCH 1020 is coupled to a display 1045 (such as a flat panel or touchscreen display). GMCH 1020 may include an integrated graphics accelerator. GMCH 1020 is further coupled to an input/output (I/O) controller hub (ICH) 1050, which may be used to couple various peripheral devices to system 1000. Shown for example in the embodiment of FIG. 10 is an external graphics device 1060, which may be a discrete graphics device, coupled to ICH 1050, along with another peripheral device 1070.

Alternatively, additional or different processors may also be present in the system 1000. For example, additional processor(s) 1015 may include additional processors(s) that are the same as processor 1010, additional processor(s) that are heterogeneous or asymmetric to processor 1010, accelerators (such as, e.g., graphics accelerators or digital signal processing (DSP) units), field programmable gate arrays, or any other processor. There can be a variety of differences between the processor(s) 1010, 1015 in terms of a spectrum of metrics of merit including architectural, micro-architectural, thermal, power consumption characteristics, and the like. These differences may effectively manifest themselves as asymmetry and heterogeneity amongst the processors 1010, 1015. For at least one embodiment, the various processors 1010, 1015 may reside in the same die package.

Figure 11:
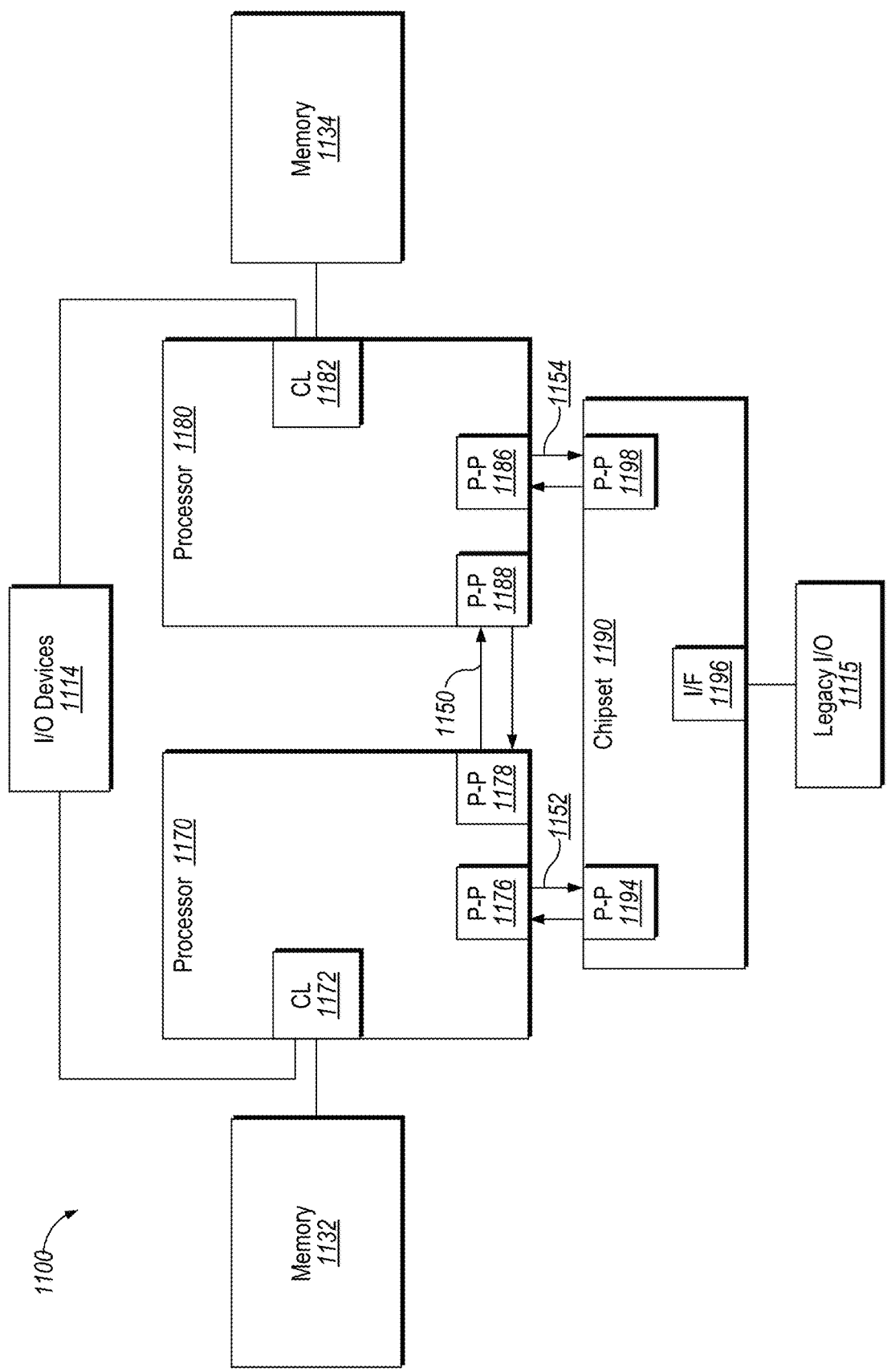
FIG. 11 is a block diagram illustrating a system in which an embodiment of the disclosure may operate.

Referring now to FIG. 11, shown is a block diagram of a system 1100 in which an embodiment of the disclosure may operate. FIG. 11 illustrates processors 1170, 1180. In one embodiment, processors 1170, 1180 may implement hybrid cores as described above. Processors 1170, 1180 may include integrated memory and I/O control logic ("CL") 1172 and 1182, respectively and intercommunicate with each other via point-to-point interconnect 1150 between point-to-point (P-P) interfaces 1178 and 1188 respectively. Processors 1170, 1180 each communicate with chipset 1190 via point-to-point interconnects 1152 and 1154 through the respective P-P interfaces 1176 to 1194 and 1186 to 1198 as shown. For at least one embodiment, the CL 1172, 1182 may include integrated memory controller units. 1172, 1182 may include I/O control logic. As depicted, memories 1132, 1134 coupled to CLs 1172, 1182 and I/O devices 1114 are also coupled to the control logic 1172, 1182. Legacy I/O devices 1115 are coupled to the chipset 1190 via interface 1196. In various embodiments, processor 1170 and/or processor 1180 can perform automatic prediction of hard-to-predict convergent branches as described herein. Additionally, processor 1170 or processor 1180, in various embodiments, is the same as any one of processing devices 100A-F.

Figure 12:
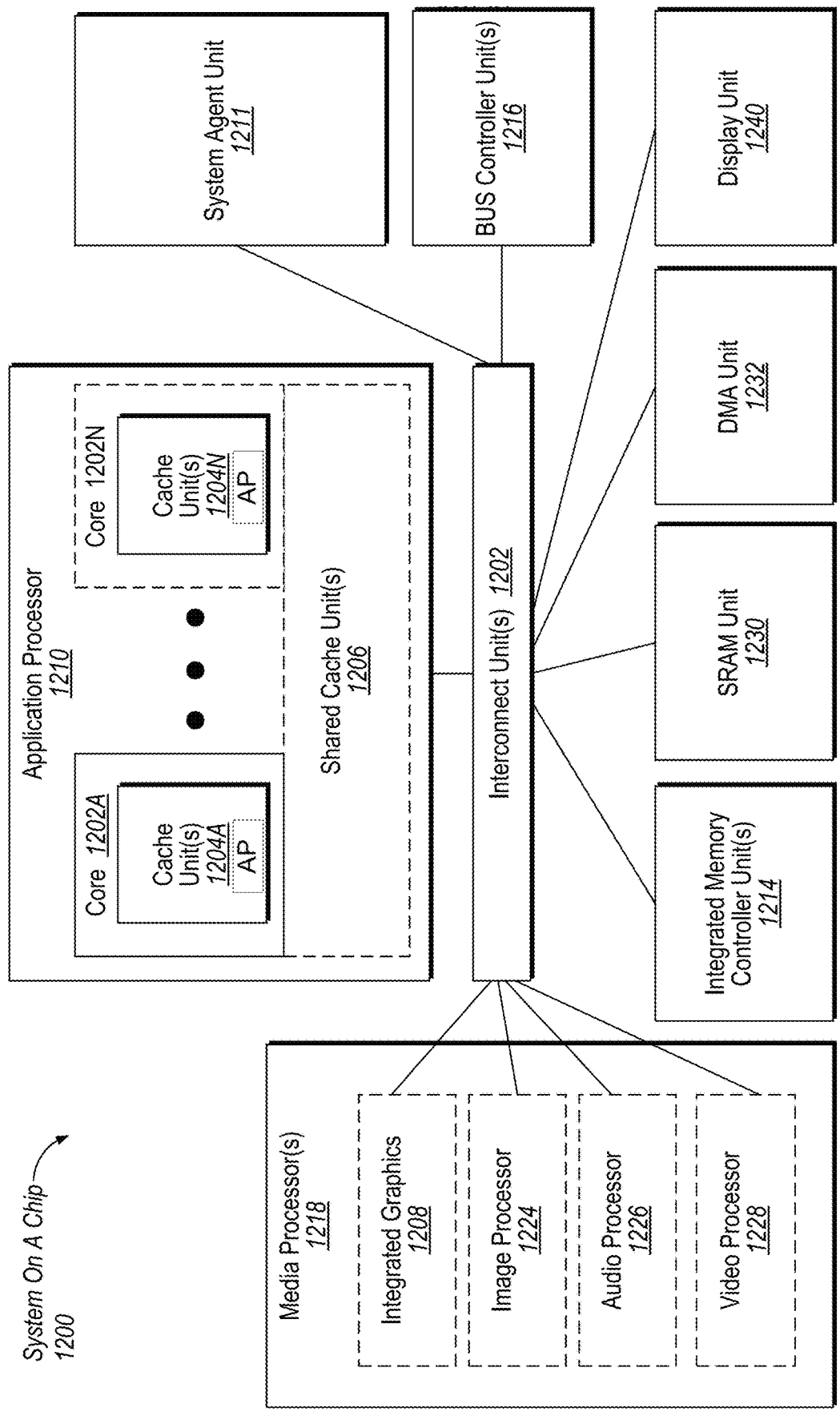
FIG. 12 is a block diagram illustrating a System-on-a-Chip (SoC) according to an embodiment of the disclosure.

Embodiments may be implemented in many different system types. FIG. 12 is a block diagram of a SoC 1200 in accordance with an embodiment of the present disclosure. Dashed lined boxes are optional features on more advanced SoCs. In FIG. 12, an interconnect unit(s) 1212 is coupled to: an application processor 1210 which includes a set of one or more cores 1202A-N and shared cache unit(s) 1206; a system agent unit 1211; a bus controller unit(s) 1216; an integrated memory controller unit(s) 1214; a set or one or more media processors 1218 which may include integrated graphics logic 1208, an image processor 1224 for providing still and/or video camera functionality, an audio processor 1226 for providing hardware audio acceleration, and a video processor 1228 for providing video encode/decode acceleration; an static random access memory (SRAM) unit 1030; a direct memory access (DMA) unit 1232; and a display unit 1240 for coupling to one or more external displays. In one embodiment, a memory module may be included in the integrated memory controller unit(s) 1214. In another embodiment, the memory module may be included in one or more other components of the SoC 1200 that may be used to access and/or control a memory. The application processor 1220 may include a store address predictor for implementing hybrid cores as described in embodiments herein. In various embodiments, application processor 1210 can perform automatic prediction of hard-to-predict convergent branches as described herein. Additionally, application processor 1210, in various embodiments, is the same as any one of processing devices 100A-F.

The memory hierarchy includes one or more levels of cache within the cores, a set or one or more shared cache units 1206, and external memory (not shown) coupled to the set of integrated memory controller units 1214. The set of shared cache units 1206 may include one or more mid-level caches, such as level 2 (L2), level 3 (L3), level 4 (L4), or other levels of cache, a last level cache (LLC), and/or combinations thereof.

In some embodiments, one or more of the cores 1202A-N are capable of multithreading. The system agent 1211 includes those components coordinating and operating cores 1202A-N. The system agent unit 1211 may include for example a power control unit (PCU) and a display unit. The PCU may be or include logic and components needed for regulating the power state of the cores 1202A-N and the integrated graphics logic 1208. The display unit is for driving one or more externally connected displays.

The cores 1202A-N may be homogenous or heterogeneous in terms of architecture and/or instruction set. For example, some of the cores 1202A-N may be in order while others are out-of-order. As another example, two or more of the cores 1202A-N may be capable of execution the same instruction set, while others may be capable of executing only a subset of that instruction set or a different instruction set.

The application processor 1220 may be a general-purpose processor, such as a Core™ i3, i5, i7, 2 Duo and Quad, Xeon™, Itanium™, Atom™ or Quark™ processor, which are available from Intel™ Corporation, of Santa Clara, Calif. Alternatively, the application processor 1220 may be from another company, such as ARM Holdings™, Ltd, MIPS™, etc. The application processor 1210 may be a special-purpose processor, such as, for example, a network or communication processor, compression engine, graphics processor, co-processor, embedded processor, or the like. The application processor 1210 may be implemented on one or more chips. The application processor 1210 may be a part of and/or may be implemented on one or more substrates using any of a number of process technologies, such as, for example, BiCMOS, CMOS, or NMOS.

Figure 13:
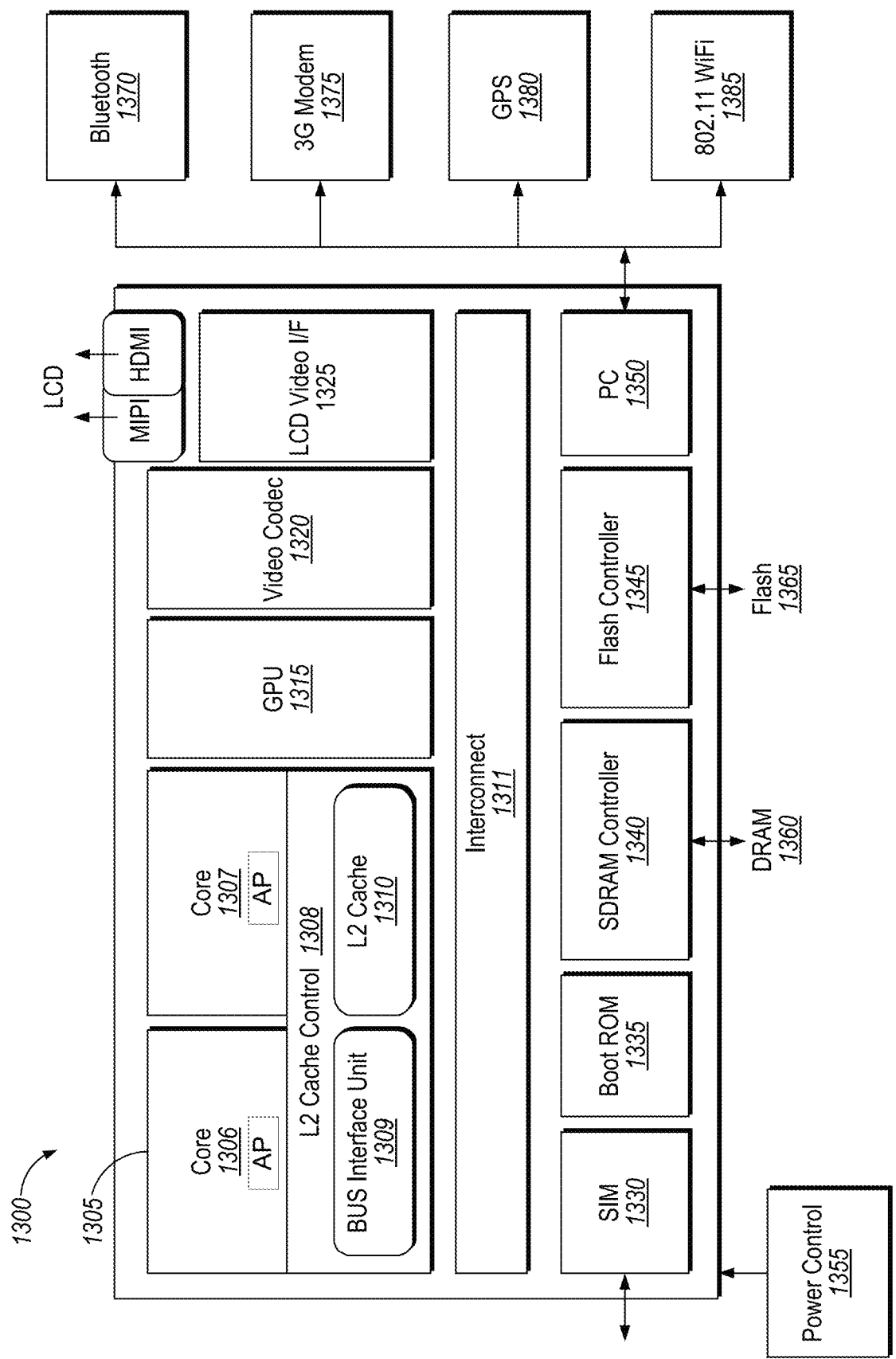
FIG. 13 is a block diagram illustrating a SoC design according to an embodiment of the disclosure.

FIG. 13 is a block diagram of an embodiment of a system on-chip (SoC) design in accordance with the present disclosure. As a specific illustrative example, SoC 1300 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network. In various embodiments, SOC 1300 can perform automatic prediction of hard-to-predict convergent branches as described herein. Additionally, SOC 1300, in various embodiments, is the same as any one of processing devices 100A-F.

Here, SOC 1300 includes 2 cores—1306 and 1307. Cores 1306 and 1307 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 1306 and 1307 are coupled to cache control 1308 that is associated with bus interface unit 1309 and L2 cache 1310 to communicate with other parts of system 1300. Interconnect 1311 includes an on-chip interconnect, such as an IOSF, AMBA, or other interconnect discussed above, which potentially implements one or more aspects of the described disclosure. In one embodiment, cores 1306, 1307 may implement hybrid cores as described in embodiments herein.

Interconnect 1311 provides communication channels to the other components, such as a Subscriber Identity Module (SIM) 1330 to interface with a SIM card, a boot ROM 1335 to hold boot code for execution by cores 1306 and 1307 to initialize and boot SoC 1300, a SDRAM controller 1340 to interface with external memory (e.g. DRAM 1360), a flash controller 1345 to interface with non-volatile memory (e.g. Flash 1365), a peripheral control 1350 (e.g. Serial Peripheral Interface) to interface with peripherals, video codecs 1320 and Video interface 1325 to display and receive input (e.g. touch enabled input), GPU 1315 to perform graphics related computations, etc. Any of these interfaces may incorporate aspects of the disclosure described herein. In addition, the system 1300 illustrates peripherals for communication, such as a Bluetooth module 1370, 3G modem 1375, GPS 1380, and Wi-Fi 1385.

Figure 14:
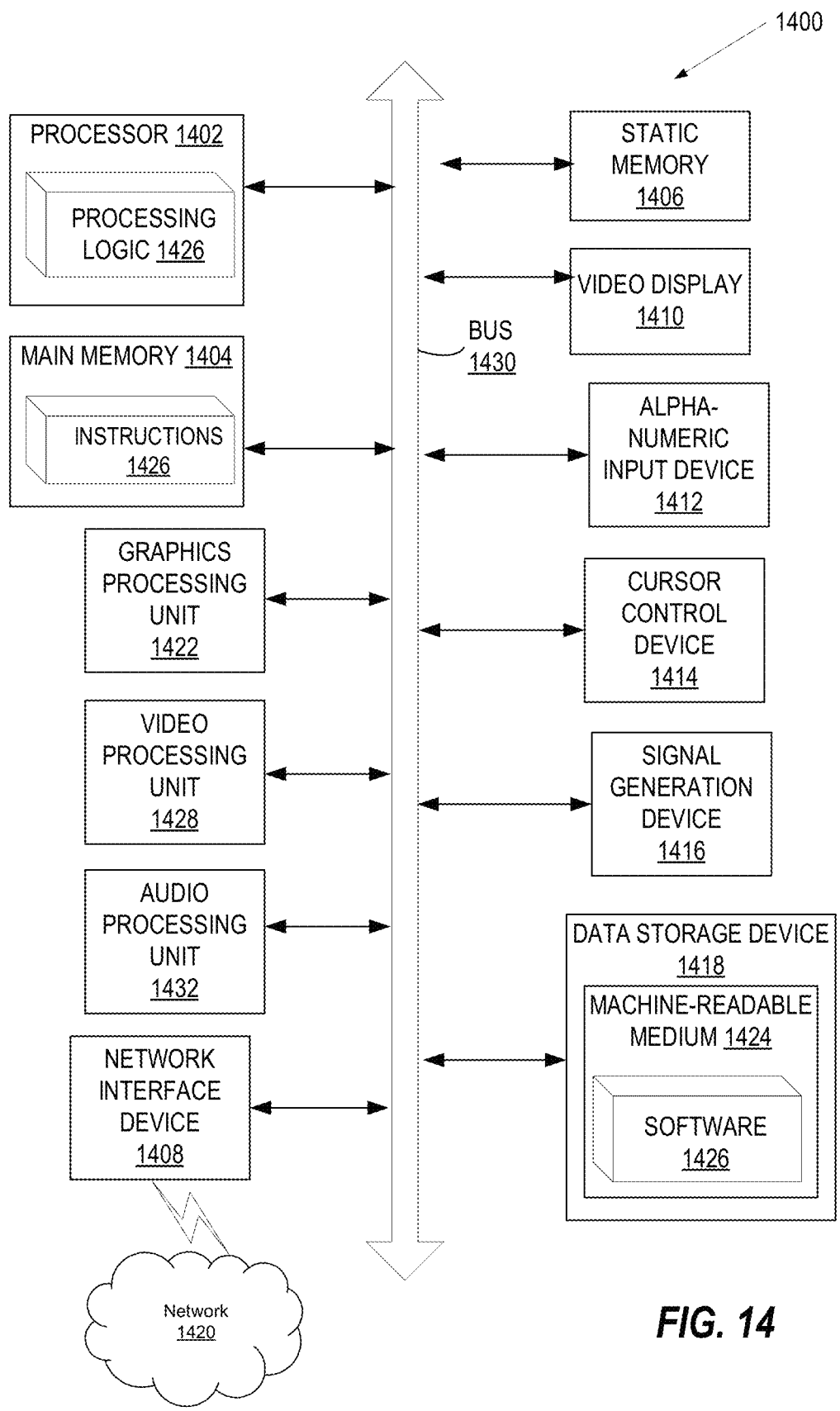
FIG. 14 illustrates a block diagram illustrating a computer system according to an embodiment of the disclosure.

FIG. 14 illustrates a diagrammatic representation of a machine in the example form of a computer system 1400 within which a set of instructions, for causing the machine to perform any one or more of the methodologies discussed herein, may be executed. For example, computer system 1400 can perform automatic prediction of hard-to-predict convergent branches as described herein. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1400 includes a processing device 1402, a main memory 1404 (e.g., read-only memory (ROM), flash memory, dynamic random access memory (DRAM) (such as synchronous DRAM (SDRAM) or DRAM (RDRAM), etc.), a static memory 1406 (e.g., flash memory, static random access memory (SRAM), etc.), and a data storage device 1418, which communicate with each other via a bus 1430.

Processing device 1402 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1402 may also be one or more special-purpose processing devices such as an application specific integrated circuit (ASIC), a field programmable gate array (FPGA), a digital signal processor (DSP), network processor, or the like. In one embodiment, processing device 1402 may include one or more processing cores. The processing device 1402 is configured to execute the processing logic 1426 for performing the operations and steps discussed herein.

The computer system 1400 may further include a network interface device 1408 communicably coupled to a network 1420. The computer system 1400 also may include a video display unit 1410 (e.g., a liquid crystal display (LCD) or a cathode ray tube (CRT)), an alphanumeric input device 1412 (e.g., a keyboard), a cursor control device 1414 (e.g., a mouse), and a signal generation device 1416 (e.g., a speaker). Furthermore, computer system 1400 may include a graphics processing unit 1422, a video processing unit 1428, and an audio processing unit 1232.

The data storage device 1418 may include a machine-accessible storage medium 1424 on which is stored software 1426 implementing any one or more of the methodologies of functions described herein, such as implementing store address prediction for memory disambiguation as described above. The software 1426 may also reside, completely or at least partially, within the main memory 1404 as instructions 1426 and/or within the processing device 1402 as processing logic 1426 during execution thereof by the computer system 1400; the main memory 1404 and the processing device 1402 also constituting machine-accessible storage media.

The machine-readable storage medium 1424 may also be used to store instructions 1426 implementing store address prediction for hybrid cores such as described according to embodiments of the disclosure. While the machine-accessible storage medium 1424 is shown in an example embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present disclosure. The term "machine-accessible storage medium" shall accordingly be taken to include, but not be limited to, solid-state memories, and optical and magnetic media.

The following examples pertain to further embodiments.

Example 1 is a processing device comprising: branch predication circuitry to: 1) determine a dynamic convergence point in a conditional branch of a set of instruction; 2) store the dynamic convergence point in a branch instruction pointer (IP) table; 3) fetch a first speculative path and a second speculative path of the conditional branch; 4) while determining which of the first speculative path and the second speculative path is a taken path of the conditional branch and determining whether a dynamic convergence point is fetched corresponding to the stored dynamic convergence point, stall scheduling of instructions of the first speculative path and the second speculative path; and 5) in response to determining that one of the first speculative path and the second speculative path is the taken path and the fetched dynamic convergence point corresponds to the stored convergence point, resume scheduling of the instructions of the taken path.

In Example 2, the processing device of Example 1, further comprising: a branch instruction buffer coupled to the branch IP table and the branch predication circuitry; wherein the branch predication circuitry to determine a dynamic convergence point further comprises the branch predication circuitry to, in response to misprediction of the first speculative path: store a number of instructions of the first speculative path in the branch instruction buffer; fetch the number of instructions of the second speculative path; and determine a matching instruction pointer between the stored number instructions of the first speculative path and the fetched number of instructions of the second speculative path.

In Example 3, the processing device of Example 1, wherein the fetch the first speculative path and the second speculative path comprises: override original prediction of a branch prediction unit of the processing device to fetch the first speculative path.

In Example 4, the processing device of Example 3, in response to completing fetching the first speculative path, override the original prediction of the branch prediction unit of the processing device to fetch the second speculative path.

In Example 5, the processing device of Example 1, wherein the fetch the first speculative path and the second speculative path comprises: comparing a number of bytes of the first speculative path or the second speculative path to a threshold value; and determine divergence when the number bytes of the first speculative path or the second speculative path exceeds the threshold value.

In Example 6, the processing device of Example 5, further comprising in response to determining the divergence, executing a control misspeculation/branch misprediction instruction.

In Example 7, the processing device of Example 5, further comprising in response to determining the divergence, convert fetched micro-operations of a wrong path to no-operations.

In Example 8, the processing device of Example 5, wherein the dynamic convergence point in the direct conditional branch is not static.

Various implementations may have different combinations of the structural features described above. For instance, all optional features of the processors and methods described above may also be implemented with respect to a system described herein and specifics in the examples may be used anywhere in one or more implementations.

In Example 9, a processing system comprising a core; memory coupled to the core; branch predication circuitry coupled to the core and the memory, the branch prediction circuitry to: determine a dynamic convergence point in a conditional branch; setting an automatic predication flag corresponding to the conditional branch in the branch IP table; responsive to the setting of the automatic predication flag, fetch a first speculative path and a second speculative path of the conditional branch; while determining which of the first speculative path and the second speculative path is a taken path of the conditional branch, stall scheduling of instructions of the first speculative path and the second speculative path; and in response to determining that one of the first speculative path and the second speculative path is the taken path, resume scheduling of the instructions of the taken path.

In Example 10, the processing system of Example 9, further comprising: a branch instruction buffer coupled to the branch IP table and the branch predication circuitry; wherein the branch predication circuitry to determine a dynamic convergence point further comprises the branch predication circuitry; in response to misprediction of the first speculative path: store a number of instructions of the first speculative path in the branch instruction buffer; fetch the number of instructions of the second speculative path; and determine a matching instruction pointer between the stored number of instructions of the first speculative path and the fetched number of instructions of the second speculative path.

In Example 11, the processing system of Example 9, wherein the fetch the first speculative path and the second speculative path comprises: override original prediction of a branch prediction unit of the processing device to fetch the first speculative path.

In Example 12, the processing system of Example 11, in response to completing fetching the first speculative path, override the original prediction of the branch prediction unit of the processing device to fetch the second speculative path.

In Example 13, the processing system of Example 9, wherein the fetch the first speculative path and the second speculative path comprises: comparing a number of bytes of the first speculative path or the second speculative path to a threshold value; and determine divergence when the number bytes of the first speculative path or the second speculative path exceeds the threshold value.

In Example 14, the processing system of Example 13, further comprising in response to determining the divergence, executing a control misspeculation/branch misprediction instruction.

In Example 15, the processing system of Example 13, further comprising in response to determining the divergence, convert fetched micro-operations of a wrong path to no-operations.

In Example 16, the processing system of Example 13, further comprising in response to determining the divergence, convert fetched micro-operations of a wrong path to no-operations.

Various implementations may have different combinations of the structural features described above. For instance, all optional features of the processors and methods described above may also be implemented with respect to a system described herein and specifics in the examples may be used anywhere in one or more implementations.

Example 17 is a method for determining a dynamic convergence point in a conditional branch; storing the dynamic convergence point in a branch instruction pointer (IP) table; fetching a first speculative path and a second speculative path of the conditional branch; while determining which of the first speculative path and the second speculative path is a taken path of the conditional branch, stalling scheduling of instructions of the first speculative path and the second speculative path; and in response to determining that one of the first speculative path and the second speculative path is the taken path, resume scheduling of the instructions of the taken path.

In Example 18, the method of Example 17, wherein the determining a dynamic convergence point comprises: in response to misprediction of the first speculative path: storing a number of instructions of the first speculative path; fetching the number of instructions of the second speculative path; and determining a matching instruction pointer between the stored instructions of the first speculative path and the fetched instructions of the second speculative path.

In Example 19, the method of Example 17, wherein the fetching the first speculative path and the second speculative path comprises: overriding an original prediction of a branch prediction unit of the processing device to fetch the first speculative path.

In Example 20, the method of Example 17, in response to completing fetching the first speculative path, overriding the original prediction of the branch prediction unit of the processing device to fetch the second speculative path.

Various implementations may have different combinations of the structural features described above. For instance, all optional features of the processors and methods described above may also be implemented with respect to a system described herein and specifics in the examples may be used anywhere in one or more implementations.

In Example 21, is a non-transitory computer-readable medium storing instructions, which when executed by a processor, cause the processor to execute a plurality of logic operations comprising: 1) determine a dynamic convergence point in a conditional branch of a set of instruction; 2) store the dynamic convergence point in a branch instruction pointer (IP) table; 3) fetch a first speculative path and a second speculative path of the conditional branch; 4) while determining which of the first speculative path and the second speculative path is a taken path of the conditional branch and determining whether a dynamic convergence point is fetched corresponding to the stored dynamic convergence point, stall scheduling of instructions of the first speculative path and the second speculative path; and 5) in response to determining that one of the first speculative path and the second speculative path is the taken path and the fetched dynamic convergence point corresponds to the stored convergence point, resume scheduling of the instructions of the taken path.

Various implementations may have different combinations of the structural features described above. For instance, all optional features of the processors and methods described above may also be implemented with respect to a system described herein and specifics in the examples may be used anywhere in one or more implementations.

Example 22 is an apparatus comprising 1) means for determining a dynamic convergence point in a conditional branch of a set of instruction; 2) means for storing the dynamic convergence point in a branch instruction pointer (IP) table; 3) means for fetching a first speculative path and a second speculative path of the conditional branch; 4) while determining which of the first speculative path and the second speculative path is a taken path of the conditional branch and determining whether a dynamic convergence point is fetched corresponding to the stored dynamic convergence point, means for stalling scheduling of instructions of the first speculative path and the second speculative path; and 5) in response to determining that one of the first speculative path and the second speculative path is the taken path and the fetched dynamic convergence point corresponds to the stored convergence point, means for resuming scheduling of the instructions of the taken path.

Various implementations may have different combinations of the structural features described above. For instance, all optional features of the processors and methods described above may also be implemented with respect to a system described herein and specifics in the examples may be used anywhere in one or more implementations.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and/or 'operable to,' in one embodiment, refers to some apparatus, logic, hardware, and/or element designed in such a way to enable use of the apparatus, logic, hardware, and/or element in a specified manner. Note as above that use of 'to,' 'capable of/to,' and/or 'operable to,' in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 910 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A processing device comprising:
a branch instruction pointer (IP) table; and
branch predication circuitry coupled to the branch IP table, the branch predication circuitry to:
   determine a dynamic convergence point in a conditional branch of a set of instructions;
   store the dynamic convergence point in the branch IP table;
   fetch a first speculative path and a second speculative path of the conditional branch, wherein to fetch the first speculative path and the second speculative path, the branch predication circuitry is to: compare a number of bytes of the first speculative path or the second speculative path to a threshold value; and determine divergence when the number of bytes of the first speculative path or the second speculative path exceeds the threshold value;
   while determining which of the first speculative path and the second speculative path is a taken path of the conditional branch, stall scheduling of first instructions of the first speculative path and second instructions of the second speculative path; and
   in response to determining that one of the first speculative path and the second speculative path is the taken path schedule corresponding instructions of the taken path.

2. The processing device of claim 1, further comprising:
a branch instruction buffer coupled to the branch IP table and the branch predication circuitry;
wherein to determine the dynamic convergence point, the branch predication circuitry is to, in response to misprediction of the first speculative path:
store the first instructions of the first speculative path in the branch instruction buffer;
fetch the second instructions of the second speculative path; and
determine a matching instruction pointer between the stored first instructions of the first speculative path and the fetched second instructions of the second speculative path.

3. The processing device of claim 1, wherein to fetch the first speculative path and the second speculative path, the branch predication circuitry is to comprises:
override an original prediction of a branch prediction unit of the processing device to fetch the first speculative path.

4. The processing device of claim 3, wherein in response to completing fetching the first speculative path, the branch prediction circuitry is to:
override the original prediction of the branch prediction unit of the processing device to fetch the second speculative path.

5. The processing device of claim 1, wherein the branch predication circuitry is further to:
in response to determining the divergence, execute a control misspeculation/branch misprediction instruction.

6. The processing device of claim 1, wherein the branch predication circuitry is further to:
in response to determining the divergence, convert fetched micro-operations of a wrong path to no-operations.

7. The processing device of claim 1, wherein the dynamic convergence point in the conditional branch is not static.

8. A processing system comprising:
a memory; and
a processing core coupled to the memory, the processing core comprising:
a branch instruction pointer (IP) table; and
branch predication circuitry to:
determine a dynamic convergence point in a conditional branch;
set an automatic predication flag corresponding to the conditional branch in the branch IP table;
responsive to setting of the automatic predication flag, fetch a first speculative path and a second speculative path of the conditional branch, wherein to fetch the first speculative path and the second speculative path, the branch predication circuitry is to: compare a number of bytes of the first speculative path or the second speculative path to a threshold value; and determine divergence when the number of bytes of the first speculative path or the second speculative path exceeds the threshold value;
while determining which of the first speculative path and the second speculative path is a taken path of the conditional branch, stall scheduling of first instructions of the first speculative path and second instructions of the second speculative path; and
in response to determining that one of the first speculative path and the second speculative path is the taken path, schedule corresponding instructions of the taken path.

9. The processing system of claim 8, wherein the processing core further comprises a branch instruction buffer coupled to the branch IP table and the branch predication circuitry;
wherein to determine the dynamic convergence point, the branch predication circuitry is to, in response to misprediction of the first speculative path:
store the first instructions of the first speculative path in the branch instruction buffer;
fetch the second instructions of the second speculative path; and
determine a matching instruction pointer between the stored first instructions of the first speculative path and the fetched second instructions of the second speculative path.

10. The processing system of claim 8, wherein to fetch the first speculative path and the second speculative path, the branch predication circuitry is to:
override original prediction of a branch prediction unit to fetch the first speculative path.

11. The processing system of claim 10, wherein in response to completing fetching the first speculative path, the branch predication circuitry is to:
override the original prediction of the branch prediction unit of the processing core to fetch the second speculative path.

12. The processing system of claim 8, wherein the branch predication circuitry is further to:
in response to determining the divergence, execute a control misspeculation/branch misprediction instruction.

13. The processing system of claim 8, wherein the branch predication circuitry is further to:
in response to determining the divergence, convert fetched micro-operations of a wrong path to no-operations.

14. The processing system of claim 8, wherein the dynamic convergence point in the conditional branch is not static.

15. A method for comprising:
determining, by branch predication circuitry in a processing core, a dynamic convergence point in a conditional branch;
storing the dynamic convergence point in a branch instruction pointer (IP) table;
fetching a first speculative path and a second speculative path of the conditional branch, wherein the fetching comprises: comparing a number of bytes of the first speculative path or the second speculative path to a threshold value; and determining divergence when the number of bytes of the first speculative path or the second speculative path exceeds the threshold value;
while determining which of the first speculative path and the second speculative path is a taken path of the conditional branch, stalling scheduling of first instructions of the first speculative path and second instructions of the second speculative path; and
in response to determining that one of the first speculative path and the second speculative path is the taken path, scheduling corresponding instructions of the taken path.

16. The method of claim 15, wherein the determining of the dynamic convergence point comprises:

in response to determining misprediction of the first speculative path:
    storing the first instructions of the first speculative path in a branch instruction buffer;
    fetching the second instructions of the second speculative path; and
    determining a matching instruction pointer between the stored first instructions of the first speculative path and the fetched second instructions of the second speculative path.

17. The method of claim 15, wherein the fetching of the first speculative path and the second speculative path comprises:
    overriding an original prediction of a branch prediction unit of a processing device to fetch the first speculative path.

18. The method of claim 17, further comprising:
in response to completing fetching the first speculative path, overriding the original prediction of the branch prediction unit of the processing device to fetch the second speculative path.

\* \* \* \* \*